United States Patent
Qu et al.

(10) Patent No.: US 8,817,910 B2
(45) Date of Patent: Aug. 26, 2014

(54) SYSTEMS AND METHODS FOR COMMUNICATING USING ASK OR QAM WITH UNEVEN SYMBOL CONSTELLATION

(75) Inventors: Shouxing Qu, Ottawa (CA); Yan Xin, Kanata (CA); Johanna Lisa Dwyer, Kanata (CA); Paul Carpenter, St. Margarets (GB)

(73) Assignee: Blackberry Limited, Waterloo, Ontario (CA)

( * ) Notice: Subject to any disclaimer, the term of this patent is extended or adjusted under 35 U.S.C. 154(b) by 1074 days.

(21) Appl. No.: 12/192,648

(22) Filed: Aug. 15, 2008

(65) Prior Publication Data

US 2010/0040171 A1  Feb. 18, 2010

(51) Int. Cl.
*H04L 27/36* (2006.01)
*H04L 27/02* (2006.01)
*H04L 27/34* (2006.01)
*H04L 1/00* (2006.01)

(52) U.S. Cl.
CPC ............ *H04L 27/02* (2013.01); *H04L 27/3416* (2013.01); *H04L 1/0003* (2013.01); *H04L 1/0086* (2013.01)
USPC ........... 375/298; 375/299; 375/300; 375/320; 375/324

(58) Field of Classification Search
USPC ........... 375/298, 320; 370/431, 441; 455/450, 455/509, 513
See application file for complete search history.

(56) References Cited

U.S. PATENT DOCUMENTS

| | | | |
|---|---|---|---|
| 6,049,572 A | 4/2000 | Hansen | |
| 6,829,308 B2 | 12/2004 | Eroz et al. | |
| 7,062,700 B2 | 6/2006 | Shen et al. | |
| 2004/0166869 A1 | 8/2004 | Laroia et al. | |
| 2007/0204205 A1* | 8/2007 | Niu et al. | 714/780 |
| 2008/0253389 A1* | 10/2008 | Larsson | 370/441 |
| 2009/0003466 A1* | 1/2009 | Taherzadehboroujeni et al. | 375/260 |

FOREIGN PATENT DOCUMENTS

| | | |
|---|---|---|
| DE | 19705354 | 8/1998 |
| WO | 2006041341 | 4/2006 |
| WO | 2007/123366 A2 | 11/2007 |
| WO | 2007012366 | 11/2007 |

OTHER PUBLICATIONS

US Office Action from U.S. Appl. No. 12/192,563 dated Sep. 16, 2011.
International Search Report dated Nov. 30, 2009 for International Patent Application No. PCT/CA2009/001132.
Marvell; "Higher Order Modulations for Muros-Concept Description," 3GPP TSG GERAN#38, GP-080652, Malaga, Spain, May 12-16, 2008.
"Multi-User Reusing-One-Slot (MUROS)," 3GPP TSG GERAN #36, GP-072033, Vancouver, Canada, Nov. 12-16, 2007.
Papke et al., "Combined Multilevel Turbo-Code with MR-Modulation" IEEE International Conference on Communications (ICC) held in Seattle, U.S. A. vol. 2, Jun. 18-22, 1995, pp. 668-672, XP000533098, New York, NY, U.S.A.

(Continued)

*Primary Examiner* — Daniel Washburn
*Assistant Examiner* — Eboni Hughes
(74) *Attorney, Agent, or Firm* — Cantor Colburn LLP

(57) ABSTRACT

Systems and methods of performing ASK or QAM modulation with uneven distance between symbols are provided. These are used to provide differing BER performances among bits sent from a transmitter to a receiver.

15 Claims, 17 Drawing Sheets

(56) References Cited

OTHER PUBLICATIONS

European Search Report dated May 10, 2011 from European Application No. 08162484.3.
Papke, L et al. "Combined Multilevel Turbo-code with MR-Modulation", IEEE International Conference on Communications (ICC) Held in Seattle, USA, vol. 2, Jun. 18-22, 1995, pp. 668-672 XP000533098, New York, NY, USA ISBN: 978-0-7803-2487-9.
European Search Report for European Application No. 08162485.0, dated May 10, 2011.

* cited by examiner

US 8,817,910 B2

SYSTEMS AND METHODS FOR COMMUNICATING USING ASK OR QAM WITH UNEVEN SYMBOL CONSTELLATION

FIELD OF THE APPLICATION

The application relates to systems and methods for communicating using ASK (amplitude-shift keying) or QAM (quadrature-amplitude modulation).

BACKGROUND OF THE APPLICATION

Both M-ary amplitude-shift keying (ASK) and M-ary quadrature-amplitude modulation (QAM) have been widely used in digital communications, where M is the signal constellation size. In digital modulation with an M-ary constellation, each block of $k=\log_2 M$ bits are mapped into an M-ary symbol, where k is a positive integer. The signal constellation, consisting of M points, is a geometric presentation of the candidate baseband signals to transmit. The M points are distributed on a real axis for ASK or on a complex plane for QAM to represent the M possible real or complex symbols, respectively. In an existing regular ASK or QAM constellation, the M signal points are evenly distributed, that is, the distance between any two neighboring signal points of the constellation is equal. The average bit-error rate (BER) performances, that is, the relationship of BER vs. the signal-to-noise ratio (SNR), of different bits among the k bits are quite similar.

In the application of digital speech communications, the output bits produced by a speech codec are typically reordered into a sequence of descending importance. The most important bits are those that will have the greatest impact upon the received voice quality if they are received in error. Errors to the least significant bits will have only a negligible impact upon the received voice quality. An example of this may be found with the AMR codec used in UMTS cellular systems. See 3GPP TS26.101 section 4.2.1 hereby incorporated by reference in its entirety.

It is therefore usual practice to provide additional error protection to the most important bits. The bits are therefore classed into groups. The first class of bits will receive the greatest protection. The second class will receive relatively less protection, and so on for however many classes of bits there are. An example of this may be found with the AMR codecs used in UMTS cellular systems. See 3GPP TS26.101 section 4.2.2, hereby incorporated by reference in its entirety. In that example, the importance classes are Class A, Class B, and Class C. Class A contains the bits most sensitive to errors and any error in these bits typically results in a corrupted speech frame which should not be decoded without applying appropriate error concealment. This class is protected by the Codec CRC in AMR Auxiliary Information. Classes B and C contain bits where increasing error rates gradually reduce the speech quality, but decoding of an erroneous speech frame is usually possible without annoying artifacts. Class B bits are more sensitive to errors than Class C bits. The importance ordering applies also within the three different classes and there are no significant step-wise changes in subjective importance between neighboring bits at the class borders.

In another example, when the AMR codec is used with a GSM full rate channel, the sequencing and classification of bits from speech codecs is given in TS 45.003 in section 3.9.4., hereby incorporated by reference in its entirety. The protection classes are: 1a—Data protected with the CRC and the convolution code; and 1b—Data protected with the convolution code. No unprotected bits are used.

BRIEF DESCRIPTION OF THE DRAWINGS

Embodiments of the application will now be described with reference to the attached drawings in which.

DETAILED DESCRIPTION

A broad aspect of the application provides a transmitter comprising: a UASK (amplitude shift keying with uneven distance) modulator or UQAM (quadrature amplitude modulation with uneven distance) modulator that generates symbols from input bits.

Another broad aspect of the application provides a method comprising: generating UASK (amplitude shift keying with uneven distance) symbols or UQAM (quadrature amplitude modulation with uneven distance) symbols from input bits; transmitting a signal containing the symbols.

Another broad aspect of the application provides a method comprising: a UASK (amplitude shift keying with uneven distance) demodulator or UQAM (quadrature amplitude modulation with uneven distance) demodulator that produces bits from received symbols.

Another broad aspect of the application provides a method comprising: receiving a signal containing symbols; performing UASK (uneven amplitude shift keying) demodulation or performing UQAM (uneven quadrature amplitude modulation) demodulation to produce bits from the symbols.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Systems and methods that employ ASK and QAM modulation schemes with uneven constellations, that is, the distances between two neighboring signal points (referred to as neighboring distance hereafter) in the constellations are not equal, are provided. These modulation schemes will be referred to as UASK (amplitude shift keying with uneven constellation) and UQAM (quadrature amplitude modulation with uneven constellation) respectively. A UASK constellation is an ASK constellation in which the distances between neighboring symbols in the constellation are not all equal. Similarly, with a UQAM constellation, the distance between neighboring symbols along the real axis are not all equal and/or the distance between neighboring symbols along the imaginary axis are not all equal. In some embodiments, this is employed to provide controllable bit-error rate (BER) performance, in some cases adaptively controllable, for each bit among the k bits.

Other embodiments provide one or more computer readable media having computer executable instructions stored thereon for executing, or coordinating the execution of one or more of the methods summarized above, or detailed below.

Figure 1:
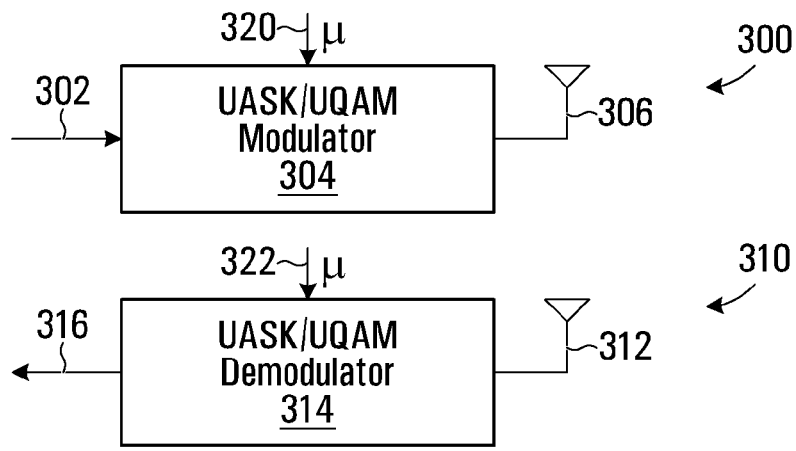
FIG. 1 is a block diagram of a UASK (amplitude-shift keying with uneven constellation)/UQAM (quadrature amplitude modulation with uneven constellation) transmitter and receiver provided by an embodiment of the application.

Referring now to FIG. 1, a first embodiment of the application will now be described. A transmitter is generally indicated at 300 and is shown to include a UASK or UQAM modulator 304 and an antenna 306. Typically, the transmitter would include either a UASK modulator, or a UQAM modulator, but the Figure shows both in the interest of brevity. The UASK or UQAM modulator 304 receives bits 302 to be mapped to symbols by the UASK or UQAM modulator. Details of UASK and UQAM modulation are provided below. For the embodiment of FIG. 1, bits 302 may include bits which are for one or multiple users to receive depending on a given implementation or application. The UASK or UQAM modulator 304 uses at least one adaptation parameter $\mu$ 320 indicative of what constellation to use, for example reflective of unevenness in the constellation. More generally, the modulator simply needs to know which symbol constellation to use. For constellations of larger size, there may be multiple such adaptation parameters, in order to provide multiple different neighboring distances between constellation points. In some embodiments, the uneven constellation used with the embodiment of FIG. 1 is fixed. In other embodiments, the constellation is changed adaptively or changed in a predetermined manner.

The receiver is generally indicated at 310, and includes a receive antenna 312 and UASK or UQAM demodulator 314 which produces output 316. The UASK or UQAM demodulator 314 performs UASK or UQAM demodulation. Details of UASK and UQAM demodulation are provided below. The $\mu$ value(s) 322 used in the UASK and UQAM demodulation are the same as those used for modulation, are used for demodulation. More generally, the receiver needs to know somehow what the symbol constellation is. In the event bits 302 included bits for multiple users, there would be multiple instances of the receiver 310, one for each user. Each user may be dedicated to receive all or a part of the bits.

Figure 2:
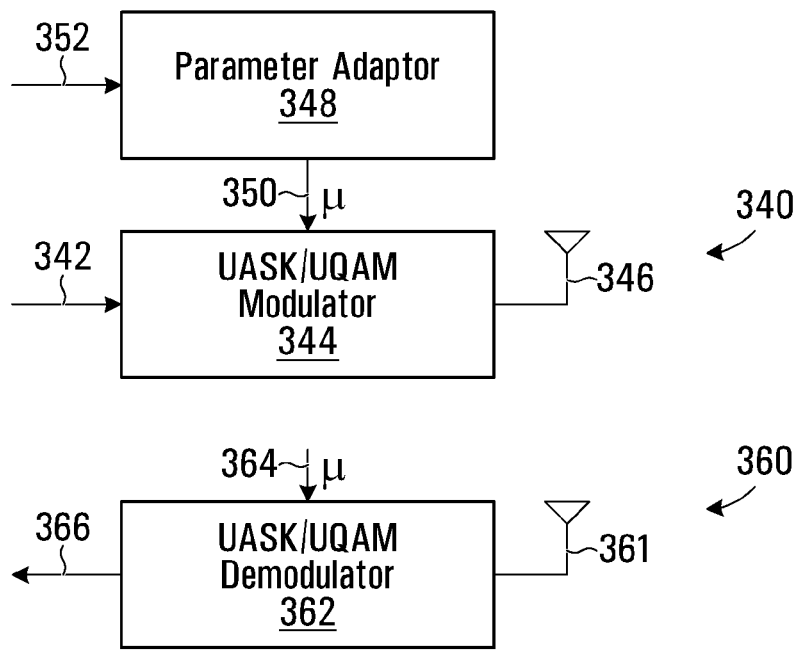
FIG. 2 is a block diagram of a UASK/UQAM transmitter and receiver provided by an embodiment of the application featuring a parameter adaptor.

Referring now to FIG. 2, a second embodiment of the application will now be described. A transmitter is generally indicated at 340 and is shown to include a UASK or UQAM modulator 344 and an antenna 346. The UASK or UQAM modulator 344 receives bits 342 to be mapped to symbols by the UASK or UQAM modulator. For the embodiment of FIG. 2, bits 342 may include bits which are for one or multiple users depending on a given implementation or application. Also shown is a parameter adaptor 348 that adaptively determines a constellation to be used by the UASK modulator or the UQAM modulator. In the illustrated example, this involves determining at least one parameter $\mu$ indicative of which constellation to use, for example one or more parameters reflective of unevenness in the constellation, and provides this at 350 to the UASK or UQAM modulator 344. For the constellations of large size, there may be multiple such parameters if multiple different neighboring distances are to be provided. The parameter adaptor 348 takes into account at least one adaptation input 352. Adaptation input(s) are application specific. In some embodiments, they are reflective (directly or indirectly) of a desired level of BER disparity between different bits (i.e., the bits at different bit positions); in some embodiments, they are reflective (directly or indirectly) of different channel conditions to be experienced by multiple receivers dedicated to receive different bits. In some embodiments, they are reflective (directly or indirectly) of the possibly different noise and interference suppression capabilities of the targeted receivers. Specific examples of adaptation inputs include required SNR (signal to noise ratio) or SINR (signal-to-interference plus noise ratio) for a targeted service quality, or measured SNR or SINR. More examples of adaptation inputs include RSSI (received signal strength indication), BER, BLER (block error rate), Mean BEP (bit error rate probability), CV BEP (coefficient of variance for BEP), FER (frame error rate), advanced receiver Capabilities (for example DARP Phase I, DARP Phase II), MCS (modulation and coding scheme), etc. The parameter adaptor 348 determines the constellation to use, and also may change the constellation used in a way that may, for example, be periodic or aperiodic. The UASK or UQAM modulator 344 uses the parameter(s) $\mu$ to set the constellation used for modulation. In some embodiments, the transmitter is configured to transmit at least one parameter reflective of unevenness in the constellation over a communication link, for example wireless or wire-line, for use by at least one receiver in performing demodulation.

The receiver is generally indicated at 360, and includes a receive antenna 361 and UASK or UQAM demodulator 362 which produces output 366. The UASK or UQAM demodulator 362 performs UASK or UQAM demodulation, optionally taking into account one or more of the parameter(s) $\mu$ shown input at 364. In the event bits 342 included bits for multiple users, there would be multiple instances of the receiver 360, one for each user. Each user may be dedicated to receive all or a part of the bits. For multiple user embodiments, as detailed below, not every receiver necessarily will need to be aware of any of the parameter(s) μ. For receivers that do need to be aware, they can learn of the parameter(s) by, for example, receiving signalling that indicates the parameter(s), by analyzing the received signal to estimate the parameter(s). It is also possible that the parameter(s) μ have been predetermined and hence the receiver will know the parameter(s) μ and when they are used. More generally, the receivers need to be aware of what constellation to use in performing demodulation.

Figure 3:
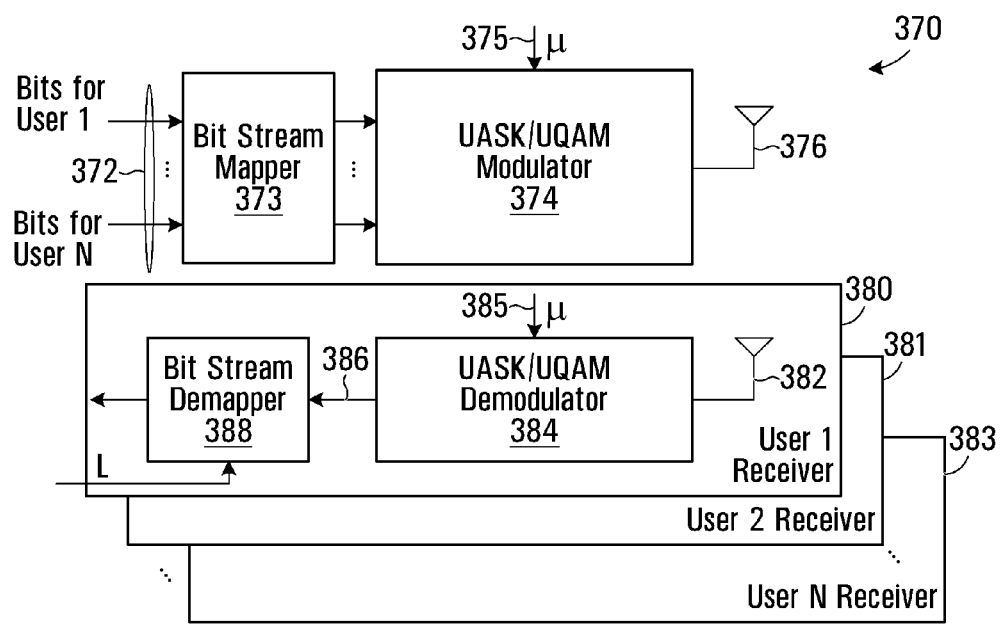
FIG. 3 is a block diagram of a UASK/UQAM transmitter and receiver provided by an embodiment of the application in which multiple bit streams for multiple users are combined.

Referring now to FIG. 3, a third embodiment of the application will now be described. A transmitter is generally indicated at 370 and is shown to include a UASK or UQAM modulator 374 and an antenna 376. The UASK or UQAM modulator 374 receives bits 372 that include bits from N different streams, for N different users, to be mapped to symbols by the UASK or UQAM modulator, where N≥2. Each symbol produced by the UASK or UQAM modulator may contain one or more bits for each of the users, or for a subset of the users. More generally, at least some of the symbols contain bits for multiple users. The UASK or UQAM modulator 374 uses at least one parameter μ 375 reflective of unevenness in the constellation. More generally, the modulator needs to know which symbol constellation to use. For constellations of larger size, there may be multiple such parameters if multiple different neighboring distances are to be provided. In some embodiments, the transmitter performs a mapping which may be static or dynamic of the input bits 372 for the multiple users to bit positions for the purpose of UASK or UQAM modulation. The illustrated bit stream mapper 373 is one example of where this might take place.

A set of receivers includes a receiver for each of the N users, specifically, user 1 receiver 380, user 2 receiver 381 and so on through to user N receiver 383. Only receiver 380 will be described in detail. The receiver includes a receive antenna 382, UASK or UQAM demodulator 384 which produces output 386. The UASK or UQAM demodulator 384 performs UASK or UQAM demodulation. The μ value(s) 385 which are the same as those used in the modulation are used by the receiver for demodulation. More generally, the receiver needs to know somehow what the symbol constellation is. In embodiments in which the transmitter performed a mapping which may be static or dynamic of the input bits 372 for the multiple users to bit positions for the purpose of UASK or UQAM modulation, the receiver needs to be aware of the mapping in order to extract the bits for that receiver. In some embodiments, the receiver includes a bit stream demapper 388 for this purpose which simply extracts the bits that are for that receiver. In the illustrated example, the bit stream mapper 388 makes use of one or more parameters L indicative of the position of the bits for that receiver. In some embodiments, these are received over the air. A specific example is detailed below in which a parameter L is conveyed though the use of training sequences.

In some embodiments, the uneven constellation used with the embodiment of FIG. 3 is fixed. In other embodiments, the constellation is changed adaptively or in a predetermined manner.

Figure 4:
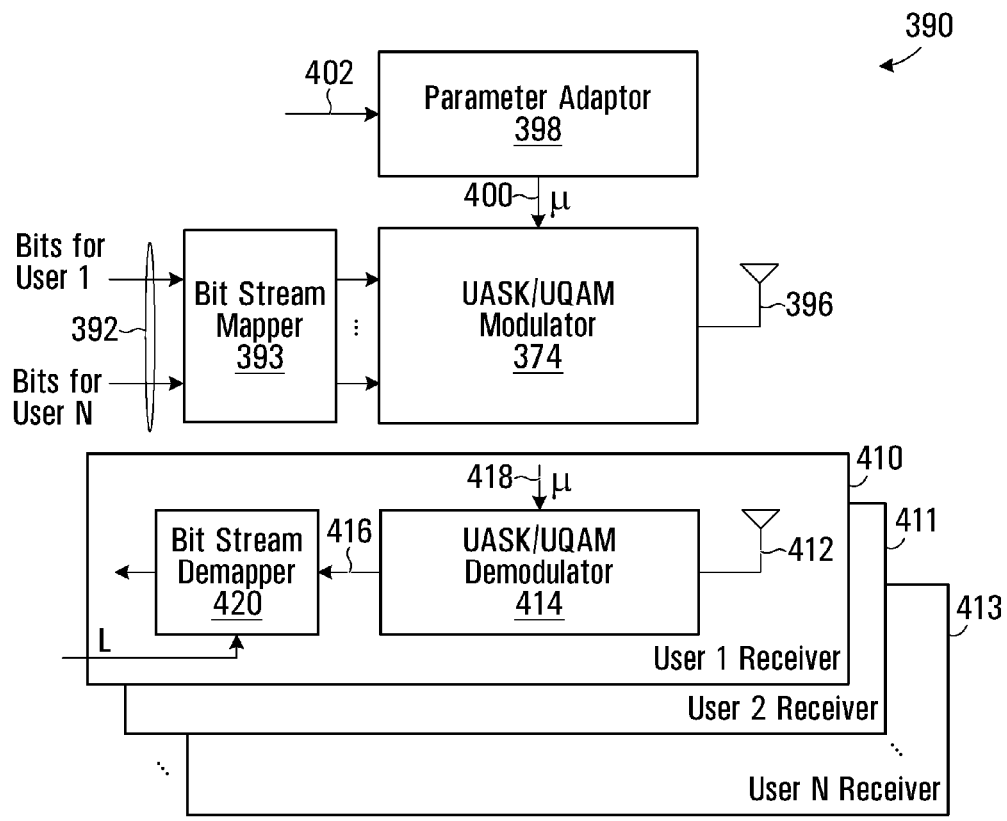
FIG. 4 is a block diagram of a UASK/UQAM transmitter and receiver provided by an embodiment of the application in which multiple bit streams for multiple users are combined, and also featuring a parameter adaptor.

Referring now to FIG. 4, a fourth embodiment of the application will now be described. A transmitter is generally indicated at 390 and is shown to include a UASK or UQAM modulator 394 and an antenna 396. The UASK or UQAM modulator 394 receives bits 392 to be mapped to symbols by the UASK or UQAM modulator that include bits from N different streams, for N different users, where N≥2. Each symbol produced by the UASK or UQAM modulator may contain one or more bits for each of the users, or for a subset of the users. More generally, at least some of the symbols contain bits for multiple users. Also shown is a parameter adaptor 398 that adaptively determines a constellation to be used by the UASK modulator or the UQAM modulator. This may for example involve determining at least one parameter μ indicative of what constellation to use, for example reflective of unevenness in the constellation and provides this at 400 to the UASK or UQAM modulator 394. For constellations of larger size, there may be multiple such parameters if multiple different neighboring distances are to be provided. The parameter adaptor 398 takes into account at least one adaptation input 402. The adaptation inputs that are used by the parameter adaptor may vary depending on the application. In some embodiments, they are reflective (directly or indirectly) of different channel conditions to be experienced by multiple receivers dedicated to receive the different bits. In some embodiments, they are reflective (directly or indirectly) of the possibly different noise and interference suppression capabilities of the targeted receivers. In some embodiments, they are reflective (directly or indirectly) of the possibly different noise and interference suppression capabilities of the targeted receivers. Specific examples of adaptation inputs include required SNR (signal to noise ratio) or SINR (signal-to-interference plus noise ratio) for a targeted service quality, or measured SNR or SINR. More general examples of adaptation inputs could include RSSI (received signal strength indication), BER, BLER (block error rate), Mean BEP (bit error rate probability), CV BEP (coefficient of variance for BEP), FER (frame error rate), advanced receiver Capabilities (for example DARP Phase I, DARP Phase II), MCS (modulation and coding scheme), etc. The parameter adaptor 348 determines the constellation to use, and may change the constellation used in a way that may, for example, be periodic or aperiodic. The UASK or UQAM modulator 394 uses the at least one parameter μ to set the constellation used for modulation. In some embodiments, the transmitter is configured to transmit the at least one parameter reflective of unevenness in the constellation over a communication link, for example wireless or wire-line, for use by at least one receiver in performing demodulation. In some embodiments, the transmitter performs a mapping which may be static or dynamic of the input bits 392 for the multiple users to bit positions for the purpose of UASK or UQAM modulation. The illustrated bit stream mapper 393 is one example of where this might take place.

A set of receivers includes a receiver for each of the N users, specifically, user 1 receiver 410, user 2 receiver 411 and so on through to user N receiver 413. Only receiver 410 will be described in detail. Receiver 410 includes a receive antenna 412, UASK or UQAM demodulator 414 which produces output 416. The UASK or UQAM demodulator 414 performs demodulation, optionally taking into account one or more of the parameter(s) μ as indicated at 418. For each symbol, each user may be dedicated to receive none, all, or a part of the demodulated bits. Receivers can learn of the parameter(s) μ by receiving signalling that indicates the parameter(s), or analyzing the received signal to estimate the parameter(s). It is also possible that the parameter(s) μ have been predetermined and hence the receiver will know the parameter(s) μ and when they are used. In embodiments in which the transmitter performed a mapping which may be static or dynamic of the input bits 392 for the multiple users to bit positions for the purpose of UASK or UQAM modulation, the receiver needs to be aware of the mapping in order to extract the bits for that receiver. In some embodiments, the receiver includes a bit stream demapper 420 for this purpose which simply extracts the bits that are for that receiver. In the illustrated example, the bit stream mapper 388 makes use of one or more parameters L indicative of the position of the bits for that receiver. In some embodiments, these are received over the air. A specific example is detailed below in which a parameter L is conveyed though the use of training sequences.

Note that the transmitters of FIGS. 1, 2, 3 and 4 may include many other components that have not been shown. A non-exhaustive set of examples of what may be included is source encoders, channel encoders, digital to analog converters, filters, frequency up-converter(s), RF amplifiers. Furthermore, while the transmitters are each shown to have a single antenna, it should be understood that multiple antenna implementations are possible as well in the transmitter. While all of the embodiment described assume a wireless channel, more generally, any communications channel is contemplated. For example, the communications channel may be a wired connection in which case, a transmitter may generate an RF signal for transmission without an antenna, by way of the wired connection. In such embodiments, neither the transmitter nor the receiver require antennas.

Some embodiments further include the above-described bit stream mapper between the input bit stream(s) and the modulator, that maps input bits to bit positions. In some embodiments, the bit stream mapper works in connection with the constellation selection process and takes into account the adaptation inputs. Specific examples of embodiments that include bit stream mappers are described below. For example, for the UASK case, each symbol is determined by two bits, a strong bit and a weak bit. The strong bit is transmitted with relatively stronger error immunity than the weak bit. If the data for a first and second user is to be carried by the two bits, the bit stream mapper decides which user's data should be transmitted as the strong bit or weak bit. This will result in the assignment of different BER performances to the first and second users, or can be used to achieve BER parity between the two users where one user experiences different channel propagation conditions, more noise and or interference, or has a less advanced receiver capability for suppressing noise and or interference. The function of the bit stream mapper is not limited to the multiple user case. Bit stream mapping may be performed adaptively or in a fixed manner. In the event adaptation is employed, adaptation inputs that are the same or similar to those described for the adaptation of the symbol constellation may be employed. The adaptation inputs are used by the bit stream mapper to determine the relative assignment of input bit strength requirements to symbol constellation point strength.

Some single user applications also may benefit from bit stream mapping. In that case bits for the single user are selectively mapped to bit positions so as to control BER of the various bits. A specific example of where this is applied to the output of a codec is described in detail below.

The BER achieved by a given receiver is a function of more than just the symbol constellation used at the transmitter. It is also a function of the channel conditions at the times of transmission between the transmitter and the receiver. It is also a function of the capabilities of the receiver in terms of its ability to suppress noise and interference. These factors can differ between a set of receivers who are to each receive one or more bits of a transmitted UASK or UQAM symbol.

In some embodiments, the parameter adaptor is configured to determine the constellation by taking into account a target BER performance for different bit positions of the input bits. Target BER performance is used in a very general sense, and can include specific targets or ranges, or relative targets or ranges to name a few specific examples, or simply relative BER performances of the different bit positions.

For applications with a single receiver, this may involve determining the constellation by taking into account a target differentiated BER performance for different bit positions of the input bits that are for receipt by a common receiver, and then subsequently mapping the bits to the specific constellation positions using the bit stream mapper.

In some embodiments, the parameter adaptor is configured to determine a constellation to be used by the UASK modulator or the UQAM modulator by taking into account a target BER performance for different bit positions of the input bits as received by different receivers. Again, this may involve taking into account the target BER, channel conditions, and/or receiver capabilities to name a few examples. The bit stream mapper is then used to map the input bits destined for different receivers onto the symbol constellation points in a manner which adaptively changes based on the changing targeted BER performance, changing transmission channel conditions, or any other dynamic characteristic.

The receivers of FIGS. 1, 2, 3 and 4 may include other components that have not been shown. A non-exhaustive set of examples of what may be included is RF front ends, frequency down-converter(s), analog to digital converters, hard or soft bit decider(s), channel decoders, equalizers, source decoders. Furthermore, while the receivers are each shown to have a single antenna, it should be understood that multiple antenna receiver implementations are possible as well, as are implementations where the RF input is delivered in a conducted manner instead of a radiated manner. In some embodiments, the receiver has a parameter estimator or detector (not shown) that estimates or otherwise determines the $\mu$ value(s) of the UQAM or UASK constellation by examining the received symbol. More generally, the receiver has some mechanism to determine the constellation that was used at the transmitter. Of course, this would not be necessary if the constellation was fixed and known to the receiver. In some embodiments, the receiver has a parameter estimator or detector (not shown) that estimates or otherwise determines the L value(s) indicative of which bits are for the receiver. More generally, the receiver has some mechanism to determine which bits are for the receiver. Of course, this would not be necessary if the mapping was fixed and known to the receiver.

For some embodiments, for a given modulation type, e.g. ASK or QAM, there are a finite number of different constellations that are selected between, each with different spacings of the symbol points in the constellations, each yielding corresponding differences in BERs experienced by the various bit positions. In such a case, the parameter indicative of unevenness of the constellation may simply be a constellation identifier that indicates a selected one of the finite number of different constellations employed by the transmitter.

Quaternary Uneven Ask

Figure 5:
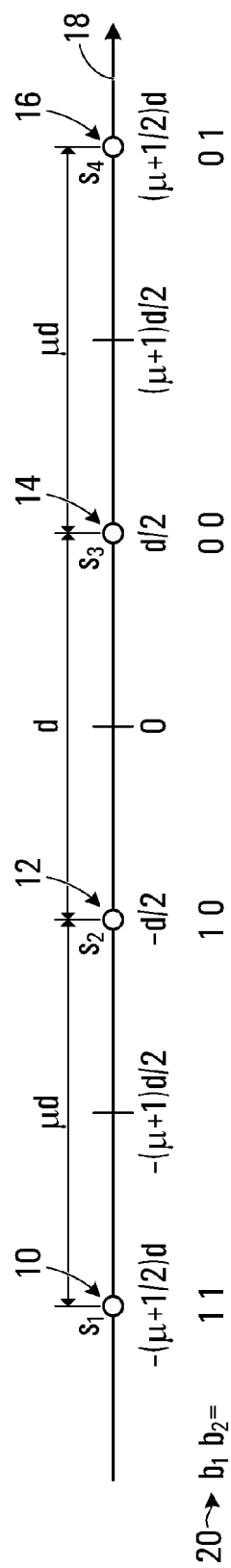
FIG. 5 is a pictorial representation of a constellation of 4-ASK with uneven distances.

Referring now to FIG. 5, shown is the constellation of quaternary uneven ASK (4-UASK) provided by an aspect of the application. The horizontal axis 18 represents the baseband signal amplitude. The constellation includes four symbols referred to as $s_1$ 10, $s_2$ 12, $s_3$ 14, $s_4$ 16. Also shown in the figure generally indicated at 20 is an example of bit-to-symbol mapping of bits $b_1 b_2$ that follows the Gray coding rule. It should be understood that the bit-to-symbol mapping relationship is not unique for this and the other examples given below. In some embodiments for this and other examples below, any Gray code mapping can be employed. For a Gray code mapping, two neighboring symbols in the constellation, have bit representations (i.e. presented by $b_1b_2$) that differ by only one bit. The distance between the two inner points $s_2$ 12, $s_3$ 14 is denoted by a positive real number, d, while the distance between an outer point and its neighbor (for example between $s_3$ 14 and $s_4$ 16) is denoted by μd, where μ is a positive real number. When μ=1.0, FIG. 5 represents a regular 4-ASK constellation with equal distance between all neighboring points, and otherwise it represents a 4-UASK constellation. For reasons described below, the bit denoted by $b_1$ will be referred to as the strong bit, and the bit denoted by $b_2$ will be referred to as the weak bit. The average symbol energy is $$E_s = \frac{1}{2}\left[\left(\frac{d}{2}+\mu d\right)^2 + \left(\frac{d}{2}\right)^2\right] = \frac{d^2}{8}[(2\mu+1)^2+1]. \quad (1)$$

Thus, $$d = \sqrt{\frac{8E_s}{B(\mu)}} \quad (2)$$

where $$B(\mu) = (2\mu+1)^2 + 1. \quad (3)$$

The average energy of each bit is $E_b=E_s/k$, where $k=\log_2(M)=2$ for M=4=the signal constellation size.

In the receiver, the two bits of each symbol can be jointly or individually detected. For example, a hard decision can be made for each bit following the rules, $$\hat{b}_1 = \begin{cases} 0 & \text{if } r > 0 \\ 1 & \text{otherwise} \end{cases} \quad (4)$$

$$\hat{b}_2 = \begin{cases} 0 & \text{if } |r| < (\mu+1)d/2 \\ 1 & \text{otherwise} \end{cases} \quad (5)$$

where r is the received symbol. A soft decision on each bit is also possible, which is often desirable when channel decoding follows. In some other implementation examples, it is also possible to include a symbol detector which makes a decision on each symbol, and then demap the symbol to the wanted bits.

In FIG. 5, the parameter μ is defined by the ratio of the distance between an outer symbol and its neighboring symbol to the distance between two inner symbols of the constellation. It should be apparent that a constellation having the symbol spacings of the FIG. 5 example can equivalently be defined using many different parameter definitions. Furthermore, the constellation could be defined without using any adaptation parameters at all, for example simply by providing values for the constellation points.

16-ary Uneven QAM

Figure 6:
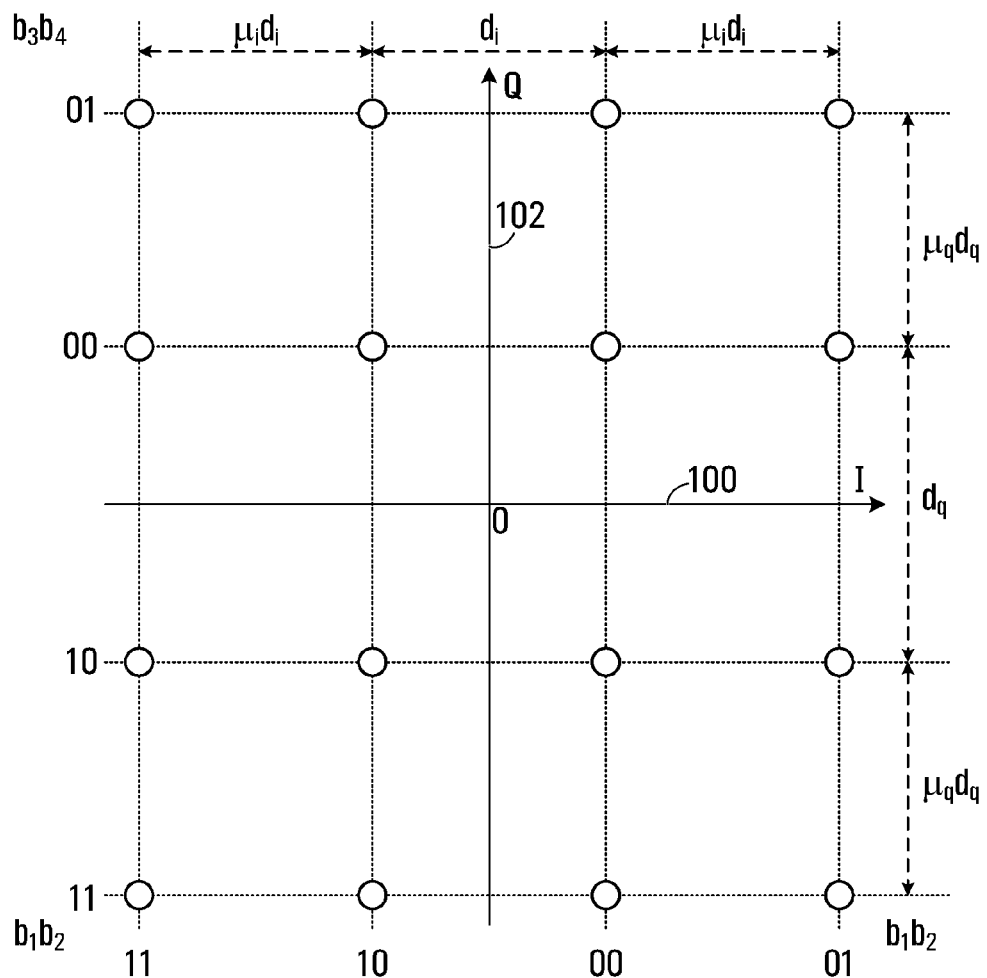
FIG. 6 is a pictorial representation of a constellation of 16-QAM with uneven distances.

In another embodiment, the concept of 4-UASK is extended to 16-ary uneven QAM (16-UQAM) by constituting the 16-UQAM constellation with two independent 4-UASK constellations, one for the real part, i.e., the in-phase (I) sub-channel, and another for the imaginary part, i.e., the quadrature (Q) sub-channel. An example of this is shown in FIG. 6, where for each block of k=4 bits, two of them ($b_1$ and $b_2$) are mapped to the sub-channel I (indicated by horizontal axis 100), and other two bits ($b_3$ and $b_4$) are mapped to the sub-channel Q (indicated by vertical axis 102). By setting a proper value of μ for each sub-channel, different BER performances of the strong bits and the weak bits can be obtained for each sub-channel.

Note that in FIG. 6, the values of μ are denoted by $μ_i$ and $μ_q$ for the sub-channel I and Q, respectively. In addition, the values of d are denoted by $d_i$ and $d_q$ for the two sub-channels respectively. In general, $μ_q$ is not necessarily equal to $μ_i$, and, $d_q$ is not necessarily equal to $d_i$. These flexibilities make it possible to let all of the four bits have different BER performances.

The parameters $μ_i$, and, $μ_q$ function similar to the single parameter μ for the FIG. 5 example. More specifically, $μ_i$ is the ratio of the distance between an outer symbol and its neighboring symbol to the distance between the two inner symbols of the constellation in the I dimension, while $μ_q$ is the ratio of the distance between an outer symbol and its neighboring symbol to the distance between the two inner symbols of the constellation in the Q dimension. Again, it should be apparent that the constellation of FIG. 6 need not necessarily be defined using these particular parameter definitions. Other parameters reflective of the unevenness of the constellations could be employed, or fixed constellations may be employed in which the constellation points are defined without reference to any parameters.

In the receiver, the four bits of each symbol can be jointly, partially jointly, or individually detected. For example, the real part and the imaginary part of the received complex symbol can be separated, and a hard decision can be made for each bit following the rules.

$$\hat{b}_1 = \begin{cases} 0 & \text{if } \text{Re}\{r\} > 0 \\ 1 & \text{otherwise} \end{cases} \quad (6)$$

$$\hat{b}_2 = \begin{cases} 0 & \text{if } |\text{Re}\{r\}| < (\mu_i+1)d_i/2 \\ 1 & \text{otherwise} \end{cases} \quad (7)$$

$$\hat{b}_3 = \begin{cases} 0 & \text{if } \text{Im}\{r\} > 0 \\ 1 & \text{otherwise} \end{cases} \quad (8)$$

$$\hat{b}_4 = \begin{cases} 0 & \text{if } |\text{Im}\{r\}| < (\mu_q+1)d_q/2 \\ 1 & \text{otherwise} \end{cases} \quad (9)$$

where $\text{Re}\{r\}$ and $\text{Im}\{r\}$ are the real part and the imaginary part of the received complex symbol r, respectively. Again, a soft decision can be made for each bit, which is often desirable when channel decoding follows. In some other implementation examples, it is also possible to include a symbol detector which makes a decision on each symbol, and then de-map the symbol to the wanted bits.

Higher Order Uneven ASK and QAM

Figure 7:
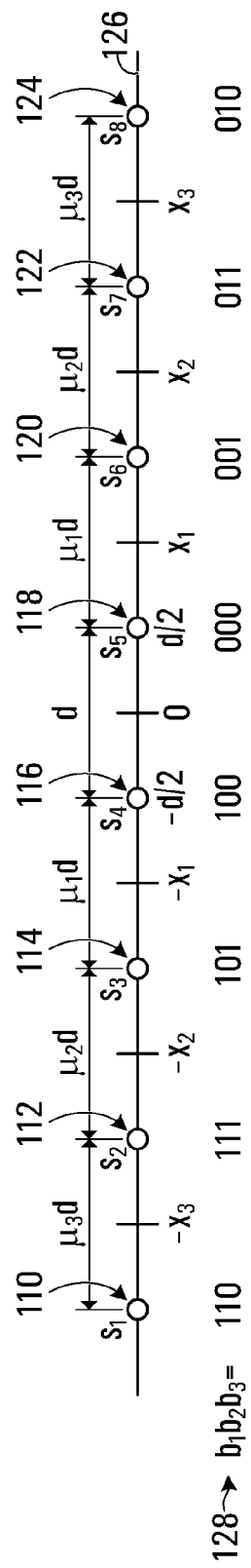
FIG. 7 is a pictorial representation of a constellation of 8-ASK with uneven distances.

In another embodiment, the above-described concept of 4-UASK is generalized to higher order UASK. As an example, FIG. 7 illustrates a higher order UASK constellation. As M=8 and k=3, each block of 3 bits, denoted by $b_1$, $b_2$ and $b_3$, is mapped to a 8-UASK symbol following Gray coding as generally indicated at 128. The horizontal axis 126 represents baseband signal amplitude. The constellation includes eight symbols referred to as $s_1$ 110, $s_2$ 112, $s_3$ 114, $s_4$ 116, $s_5$ 118, $s_6$ 120, $s_7$ 122, $s_8$ 124. The distance between the two inner points $s_4$ 116, $s_5$ 118 is denoted by d, while the distances between other neighboring points are $μ_i$d, where i=1, 2 or 3. For different choices of the values of $μ_i$, the BER performances of the 3 bits can be calculated or simulated and thus the choice of the values of $μ_i$ permit the BER performance of the 3 bits to be set differently. In the receiver, the three bits of each symbol can be jointly, or individually detected. For example, a hard decision can be made for each bit as follows, $$\hat{b}_1 = \begin{cases} 1 & \text{if } r < 0 \\ 0 & \text{otherwise} \end{cases} \quad (10)$$

$$\hat{b}_2 = \begin{cases} 1 & \text{if } |r| > x_2 \\ 0 & \text{otherwise} \end{cases} \quad (11)$$

$$\hat{b}_3 = \begin{cases} 1 & \text{if } x_1 < |r| < x_3 \\ 0 & \text{otherwise} \end{cases} \quad (12)$$

where $x_1$, $x_2$ and $X_3$ are thresholds defined by midpoints between the symbols. A soft decision can be made for each bit, which is often desirable when channel decoding follows. In some other implementation examples, it is also possible to include a symbol detector which makes a decision on each symbol, and then de-map the symbol to the wanted bits. Higher order constellations can be defined with reference to other parameter definitions than the above; also higher order constellations that are fixed may be employed.

Again, the concept of higher order UASK can be extended to higher order UQAM as in the previously described embodiments.

Implementation Examples

Figure 8A:
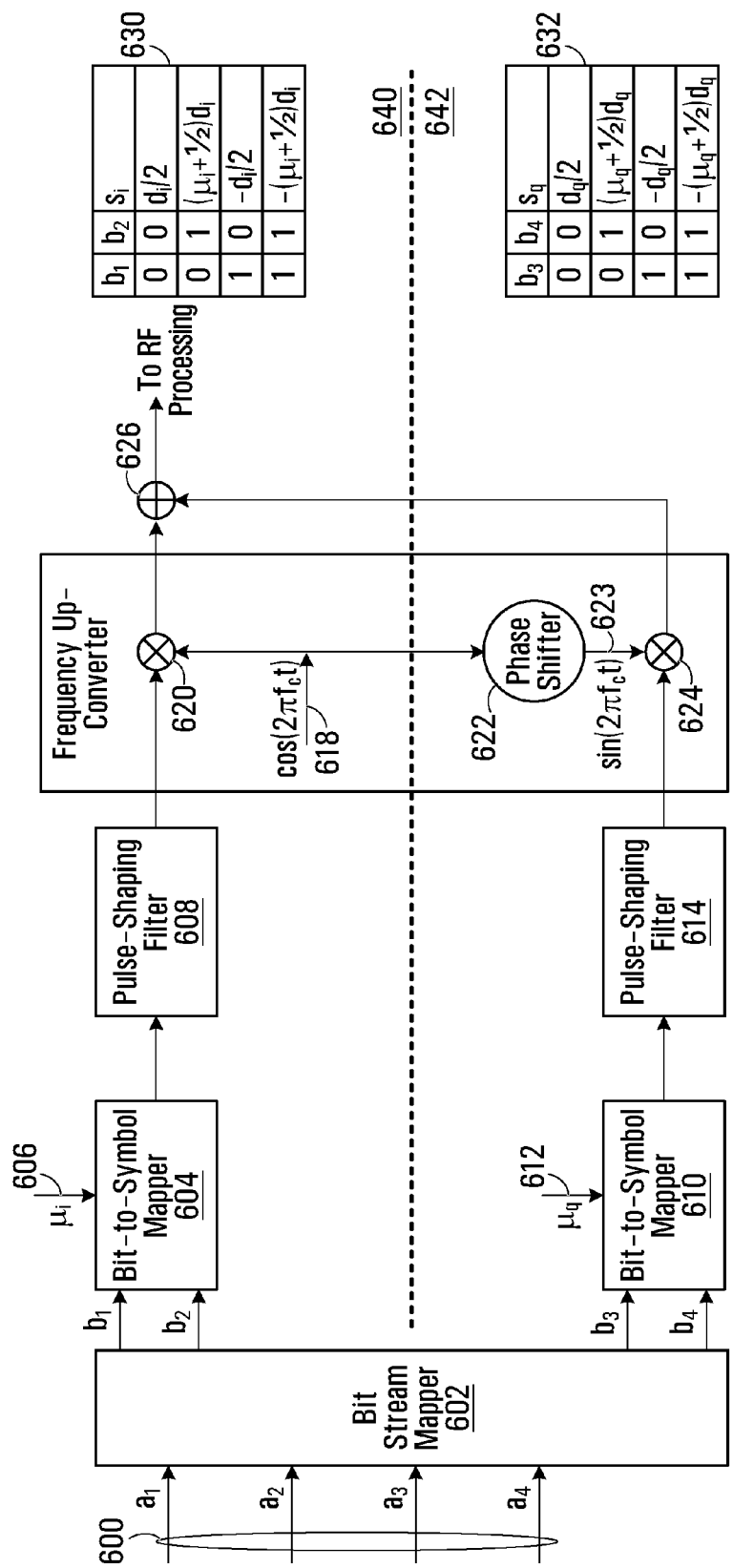
FIG. 8A is a block diagram of an example implementation of a 16-UQAM modulator with a bit stream mapper implemented.

An UASK/UQAM modulator can be implemented with any method suitable for a regular ASK/QAM modulator implementation with few changes. As an example, FIG. 8A shows the block diagram of a possible implementation of a 16-UQAM modulator, including a possible bit-to-symbol mapping relationship. As will be explained in detail below, the diagram consists of a top part 640 and a bottom part 642, representing the sub-channel I and the sub-channel Q, respectively. Each part is a 4-UASK modulator. When the bottom part is omitted, the whole block diagram represents a 4-UASK modulator. The top part 640 comprises a bit-to-symbol mapper 604, pulse-shaping filter 608, multiplier 620 and carrier source 618 providing an RF cosine signal. The multiplier 620 and the carrier source 618 constitute a frequency up-converter for the top part 640. The bottom part 642 comprises a bit-to-symbol mapper 610, pulse-shaping filter 614, multiplier 624 and phase shifter 622. The phase of the carrier source 618 is shifted by the phase shifter 622 by 90 degrees to produce an RF sine signal 623 as input to multiplier 624. The multiplier 624 and the RF sine signal constitute a frequency up-converter for the bottom part 642. The outputs of multiplier 620 and 624 are combined in adder 626 to produce the overall output which is then forwarded for RF processing. Generally indicated at 630 is a specific example of the bit-to-symbol mapping performed in the bit-to-symbol mapper 604. Similarly, generally indicated at 632 is a mapping performed by bit-to-symbol mapper 610. It can be seen that for the I and Q channels respectively, a UASK mapping is performed. Note that the parameterization of the mappings is as given in the above example, with a single parameter $\mu_i$ 606 being used to define the unevenness in the I sub-channel and a single parameter $\mu_q$ 612 being used to define the unevenness in the Q sub-channel. Of course, as described previously, this is just one example of how to define the unevenness of the constellation. The input to the bit-to-symbol mapper 604 includes bits $b_1$ and $b_2$. The input to the bit-to-symbol mapper 610 includes bits $b_3$ and $b_4$. The four bits $b_1$, $b_2$, $b_3$ and $b_4$ may be for a single receiver or for multiple receivers as described previously. Some embodiments also include a bit stream mapper. In the illustrated example, the bit stream mapper 602 takes four input bit streams collectively 600, $a_1$, $a_2$, $a_3$ and $a_4$, and maps these to the appropriate inputs, $b_1$, $b_2$, $b_3$ and $b_4$, of the bit-to-symbol mappers 604 and 610. The bit stream mapper determines which input bit, among $a_i$, i=1~4, is transmitted as $b_1$, which input bit is transmitted as $b_2$, and so on.

It should be readily apparent that a transmitter design is implementation specific, and that other components than those specifically shown in FIG. 8A may be employed in conjunction with a UASK or UQAM modulator.

Figure 9A:
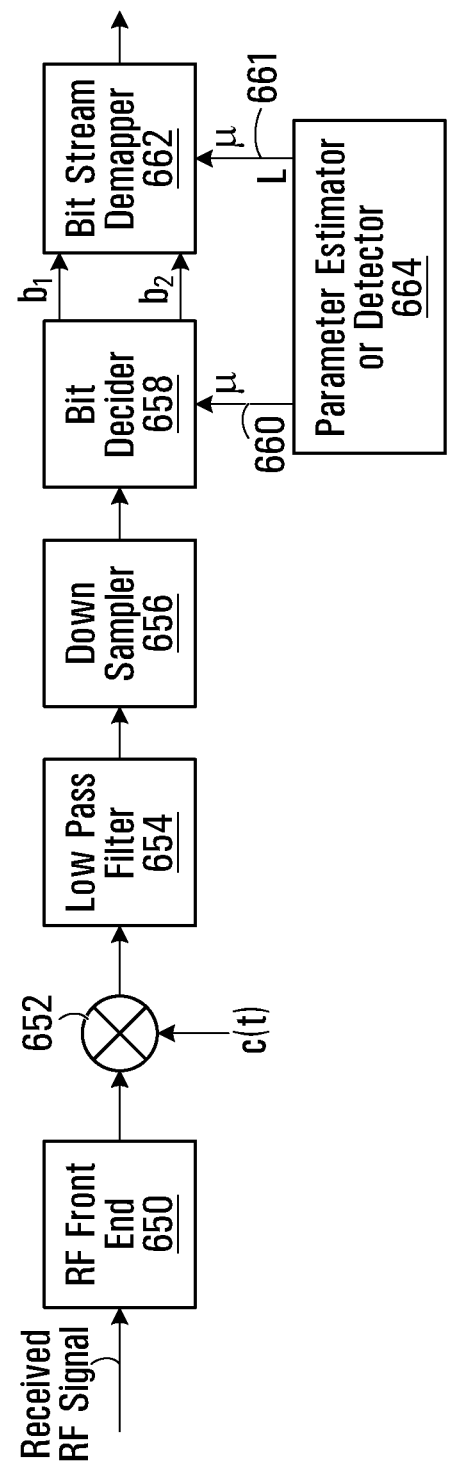
FIG. 9A is a block diagram of a receiver and demodulator for processing signals generated by the modulator of FIG. 8A.

A UASK/UQAM demodulator can be implemented with any method suitable for the regular ASK/QAM demodulator implementation with few changes. As an example, FIG. 9A shows a block diagram of a possible implementation for a receiver employing 4-UASK demodulation. Shown is an RF front end 650, multiplier 652 for performing down conversion, low pass filter 654, down sampler 656 and bit decider 658 which has an input to receive the parameter(s) μ indicative of the constellation to use, for example reflective of the unevenness of the constellation. The output of the bit decider 658 is $b_1$ or $b_2$ or both. In some other implementation examples, it is also possible to include a symbol detector which makes a decision on each symbol, and then de-map the symbol to the wanted bits. Also shown is a bit stream demapper 662. In some embodiments, the bit stream demapper 662 simply extracts bits that are for that receiver. This is appropriate for single transmitter to multiple receiver embodiments. In some embodiments, the bit stream demapper 662 is configured to perform a reverse operation upon bits of a sequencing operation that took place in the transmitter, for example to organize transmitted bits into various classes. Detailed examples of this latter approach are given below. A parameter estimator or detector 664 is provided that produces the parameter(s) μ indicative of the constellation to use. The parameter estimator or detector 664 may also provide parameter(s) indicative of which bits are for the receiver, denoted by L 661, to the bit stream demapper 662. In some embodiments, the parameter(s) μ are estimated, while in others they are detected, for example from signalling. Specific examples of μ detection is given below. More generally, the receiver needs to somehow determine what constellation was used at the transmitter. In FIG. 9A, c(t) is the local carrier signal. When c(t) is the same cosine function as that used in the top part of FIG. 8A, the bit of $b_1$ or $b_2$ or both can be recovered. Otherwise, when c(t) is the same sine function as that used in the bottom part of FIG. 8A, the bit of $b_3$ or $b_4$ or both can be recovered. If a receiver implements two receiver paths, one with the cosine function, and the other with the sine function, the receiver is able to recover any combination of one or more of $b_1$, $b_2$, $b_3$ and $b_4$. Depending on the nature of the mapping performed in the transmitter, for such an embodiment the bit stream demapper 662 may receive recovered bits from one or both the I and Q receive path for the purpose of performing bit stream demapping.

It should be readily apparent that a receiver design is implementation specific, and that other components than those specifically shown in FIG. 9A may be employed in conjunction with a UASK or UQAM modulator.

Figure 8B:
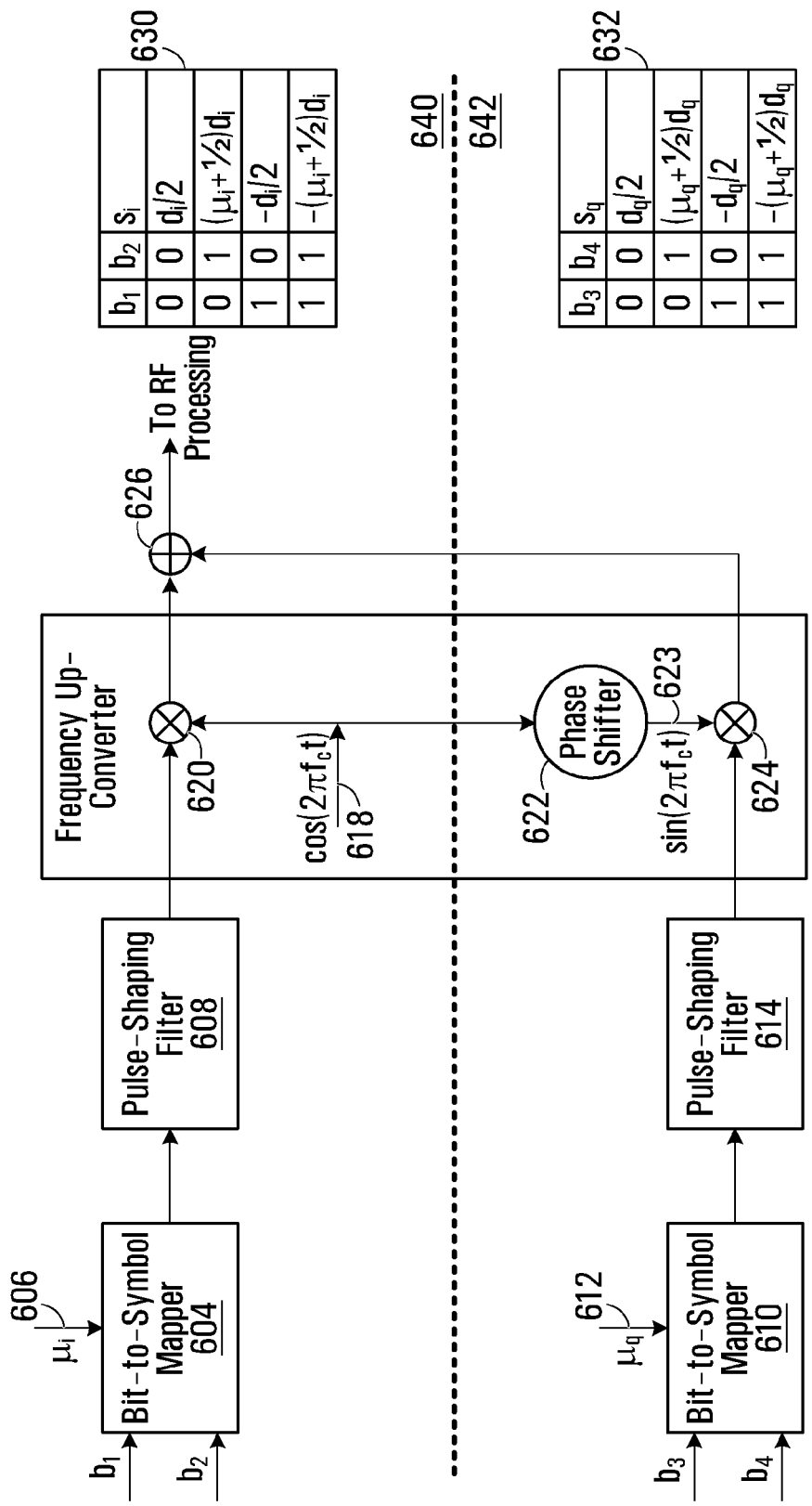
FIG. 8B is a block diagram of an example implementation of a 16-UQAM modulator without a bit stream mapper implemented.

FIG. 8B is a block diagram of another implementation of a 16-UQAM modulator. This embodiment differs from the embodiment of FIG. 8A in that there is no bit stream mapper 602. The first bit-to-symbol mapping is performed by the bit-to-symbol mapper 604 for input bits $b_1$, $b_2$, to produce symbols for an I sub-channel, and the second bit-to-symbol mapping is performed by the bit-to-symbol mapper 612 for input bits $b_3$, $b_4$, to produce symbols for a Q sub-channel.

Figure 9B:
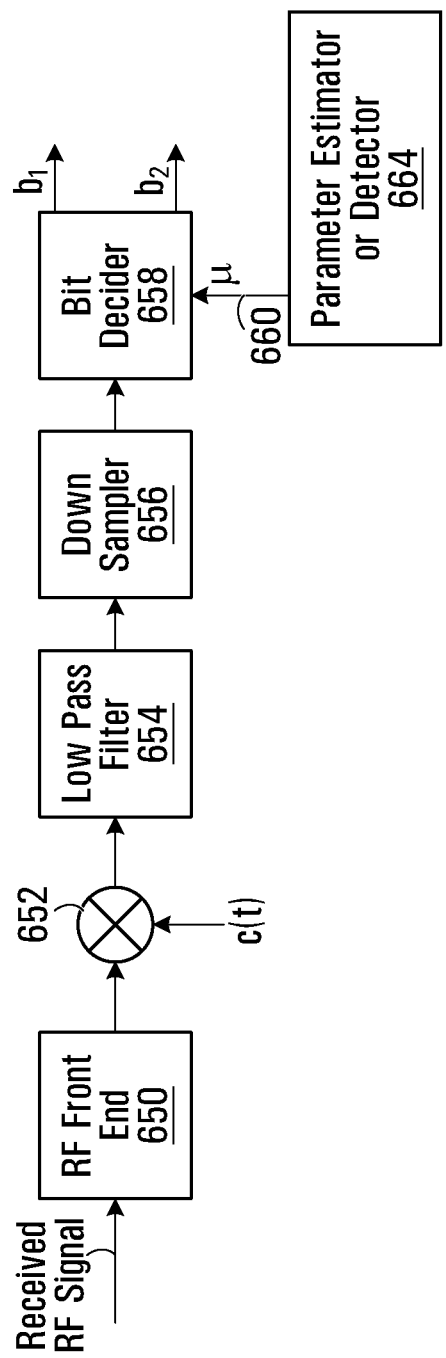
FIG. 9B is a block diagram of a receiver and demodulator for processing signals generated by the modulator of FIG. 8B.

FIG. 9B is a block diagram of an implementation of a receiver that employs 16-UQAM demodulation, corresponding with the transmitter example of FIG. 8B, differing from FIG. 9A in the absence of bit stream demapper 662.

It should be readily apparent that a receiver design is implementation specific, and that other components than those specifically shown in FIG. 9B may be employed in conjunction with a UASK or UQAM modulator.

BER Performance of 4-UASK and 16-UQAM

1) BER in AWGN Channel

It can be proven that in the AWGN channel, for 4-UASK, the BER of the strong bit (i.e., $b_1$ in FIG. 5) is $$P_{A1}(\mu, \eta_b) = \frac{1}{4}\left[\text{erfc}\left(\frac{2\mu+1}{2}A(\mu,\eta_b)\right) + \text{erfc}\left(\frac{1}{2}A(\mu,\eta_b)\right)\right]. \quad (13)$$

The BER of the weak bit (i.e., $b_2$ in FIG. 5) is $$P_{A2}(\mu, \eta_b) = \frac{1}{4}\left[2\text{erfc}\left(\frac{\mu}{2}A(\mu,\eta_b)\right) + \text{erfc}\left(\frac{\mu+2}{2}A(\mu,\eta_b)\right) - \text{erfc}\left(\frac{3\mu+2}{2}A(\mu,\eta_b)\right)\right]. \quad (14)$$

In (13) and (14), $\eta_b$ is the average signal-to-noise ratio (SNR) per bit, that is, $$\eta_b = E_b/N_o, \quad (15)$$

$$\text{erfc}(x) = \frac{2}{\sqrt{\pi}}\int_x^\infty \exp(-t^2)\,dt, \quad (16)$$

and $$A(\mu, \eta_b) = 4\sqrt{\eta_b/B(\mu)}. \quad (17)$$

In (15), $N_o$ is the single-sided power spectrum density of the AWGN, and $E_b$ is the average signal energy per bit.

2) BER in Rayleigh Fading Channel

In the fast flat Rayleigh fading channel, the instantaneous signal-to-noise ratio fluctuates constantly, following the exponential distribution. By denoting the instantaneous bit SNR by $\lambda$, and the average bit SNR by $\eta_b$, the probability density function (PDF) of $\lambda$ is $$p_\lambda = \frac{1}{\eta_b}\exp\left(-\frac{\lambda}{\eta_b}\right), \text{ for } 0 \le \lambda \le \infty. \quad (18)$$

Then, the error rate in a fast flat Rayleigh fading channel is $$P_{Ri} = \int_0^\infty P_{Ai}(\mu,\lambda)p_\lambda\,d\lambda = \int_0^\infty P_{Ai}(\mu,\lambda)\frac{1}{\eta_b}\exp\left(-\frac{\lambda}{\eta_b}\right)d\lambda, \quad (19)$$

where $P_{Ai}(\mu,\lambda)$ is the bit error rate in AWGN. Substituting (13) into (19), for the 4-UASK, the BER for the strong bit is obtained as $$P_{R1}(\mu, \eta_b) = \frac{1}{2} - \frac{1}{4}\left[\sqrt{\frac{4(2\mu+1)^2\eta_b}{4(2\mu+1)^2\eta_b + B(\mu)}} + \sqrt{\frac{4\eta_b}{4\eta_b + B(\mu)}}\right]. \quad (20)$$

By substituting (14) into (19), the BER for the weak bit is obtained as $$P_{R2}(\mu, \eta_b) = \frac{1}{2} - \frac{1}{4}\left[2\sqrt{\frac{8\mu^2\eta_b}{8\mu^2\eta_b + 2B(\mu)}} + \sqrt{\frac{8(\mu+2)^2\eta_b}{8(\mu+2)^2 + 2B(\mu)}} - \sqrt{\frac{8(3\mu+2)^2\eta_b}{8(3\mu+2)^2\eta_b + 2B(\mu)}}\right]. \quad (21)$$

3) Numerical Results

Figure 10:
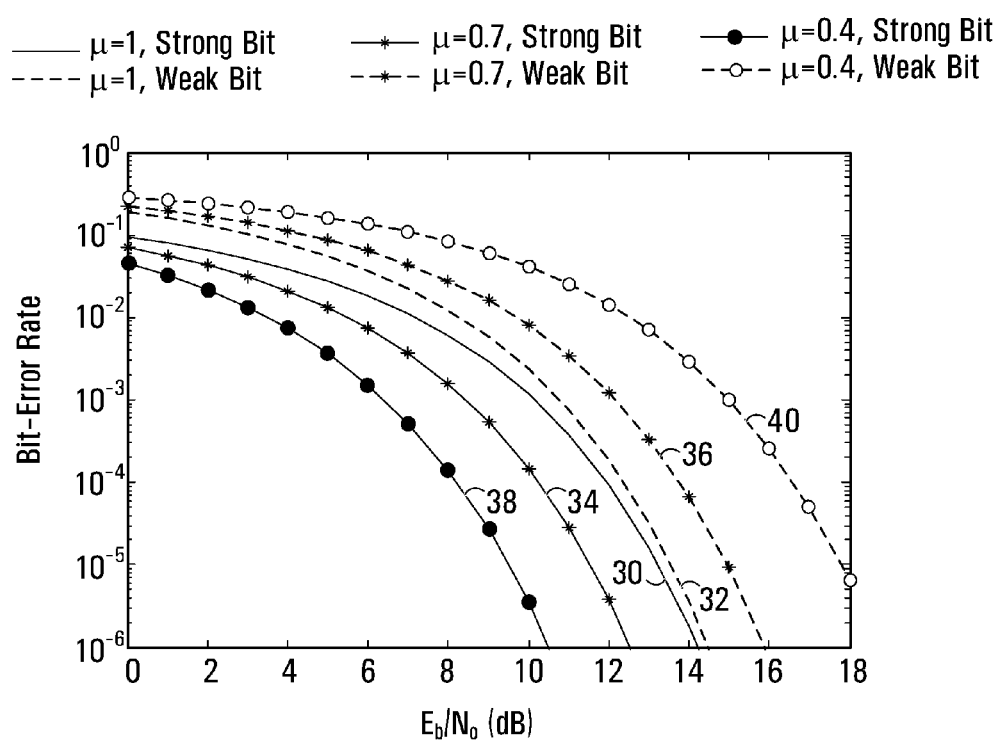
FIG. 10 contains plots of the BER vs. $E_b/N_o$ of 4-UASK in an AWGN (Additive White Gaussian Noise) channel ($\mu=1.0$, 0.7 and 0.4)

FIG. 10 shows the BER for the strong bit and the weak bit of 4-UASK in the AWGN channel for $\mu$=0.4, 0.7 and 1.0, plotted according to (13) and (14). Specifically, the BER for the strong bit for $\mu$=1.0 is indicated at 30 and the BER for the weak bit for $\mu$=1.0 is indicated at 32. The BER for the strong bit for $\mu$=0.7 is indicated at 34 and the BER for the weak bit for $\mu$=0.7 is indicated at 36. The BER for the strong bit for $\mu$=0.4 is indicated at 38 and the BER for the weak bit for $\mu$=0.4 is indicated at 40.

Figure 11:
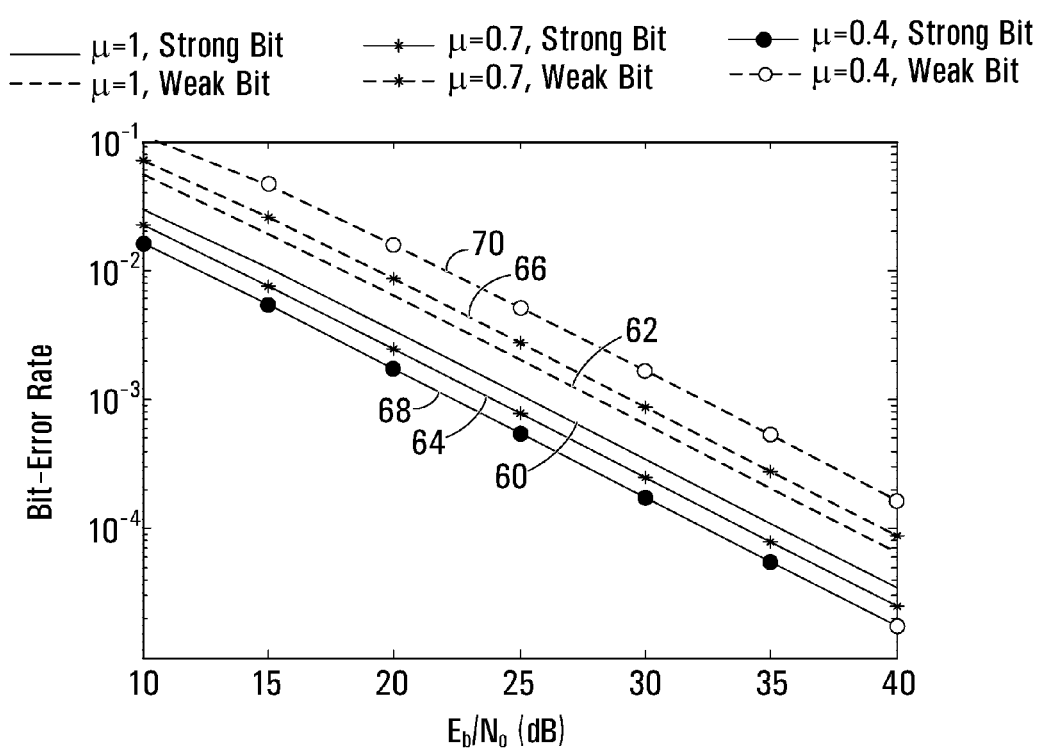
FIG. 11 contains plots of the BER vs. $E_b/N_o$ of 4-UASK in a Rayleigh fading channel ($\mu=1.0$, 0.7 and 0.4)

FIG. 11 shows the BER for the strong bit and the weak bit of 4-UASK in the fast flat Rayleigh fading channel for $\mu$=0.4, 0.7 and 1.0, plotted according to (20) and (21). Specifically, the BER for the strong bit for $\mu$=1.0 is indicated at 60 and the BER for the weak bit for $\mu$=1.0 is indicated at 62. The BER for the strong bit for $\mu$=0.7 is indicated at 64 and the BER for the weak bit for $\mu$=0.7 is indicated at 66. The BER for the strong bit for $\mu$=0.4 is indicated at 68 and the BER for the weak bit for $\mu$=0.4 is indicated at 70.

Some numerical results are summarized in Table 1. It can be seen that in the regular 4-ASK (i.e., $\mu$=1.0), the BER performances of the strong bit and the weak bit are quite close. For instance, in the AWGN channel, the difference between the strong bit and the weak bit is only 0.3 dB (for BER=$10^{-4}$). However, in the 4-UASK, this difference increases as $\mu$ decreases. When $\mu$=0.7, the difference becomes 3.6 dB, and when $\mu$=0.4, it becomes 8.4 dB. In the Rayleigh fading channel, the difference is 2.7 dB, 5.4 dB and 9.8 dB for $\mu$=1.0, 0.7 and 0.4, respectively, for BER=$10^{-3}$.

TABLE 1

Bit-Error Rate Performance of 4-UASK

| | | Required $E_b/N_o$ (dB) | | |
|---|---|---|---|---|
| Channel | μ | strong bit | weak bit | difference |
| AWGN (BER = $10^{-4}$) | 1.0 | 11.9 | 12.2 | 0.3 |
| | 0.7 | 10.2 | 13.8 | 3.6 |
| | 0.4 | 8.2 | 16.6 | 8.4 |
| Fast Flat | 1.0 | 25.4 | 28.1 | 2.7 |
| Rayleigh fading | 0.7 | 23.9 | 29.4 | 5.4 |
| (BER = $10^{-3}$) | 0.4 | 22.4 | 32.2 | 9.8 |

For 16-UQAM, because of the independency between the two sub-channels, the equations (13) and (20) are valid for the BER of the strong bit of each sub-channel, while (14) and (21) are valid for the BER of the weak bit of the same sub-channel, where $E_b$ is the average signal energy of each bit of the sub-channel.

Multi-User Transmission

Figure 12:
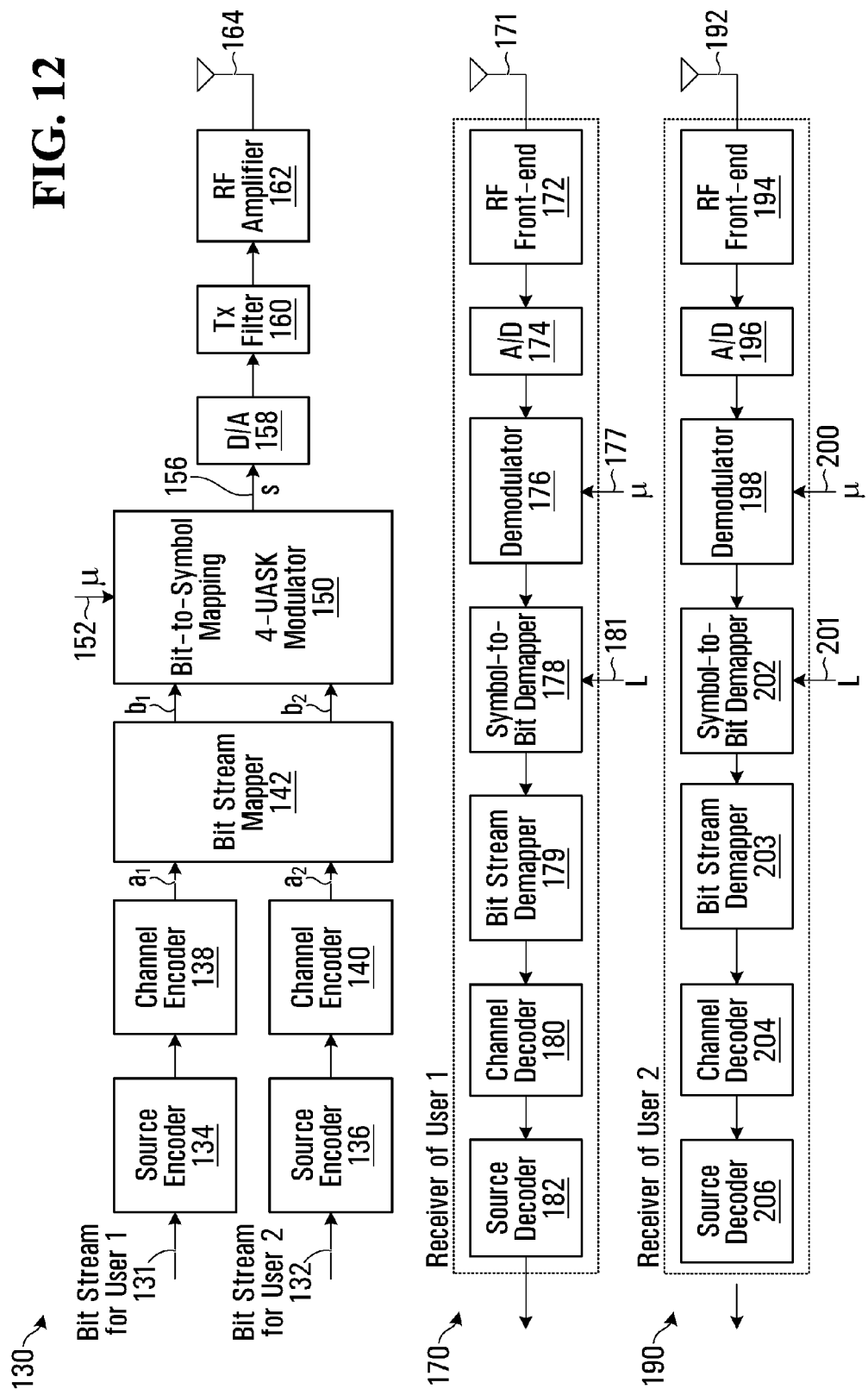
FIG. 12 is a block diagram of a transmitter and receivers in which 4-UASK is employed for the data transmission for two users.

A specific example of a transmitter and receiver that employ one of the above-described modulation approaches will now be described with reference to FIG. 12. In this example, 4-UASK is applied to transmit content to two users, through either a wireless channel or a wire-line channel. For instance, in the wireless mobile application, for the downlink (DL) transmission from a base station (BS) to two mobile stations (MS) (that is, to two-users), the two mobile stations may be located at different locations, and the signal reaching each receiver may experience significantly different propagation conditions. Moreover the relative abilities of the two receivers to suppress interference and noise, for example with advanced receiver techniques, could be different. The channel encoded data $a_1$ for one user is assigned to be $b_1$ or $b_2$ by the bit stream mapper 142 and the channel encoded data $a_2$ for another user is assigned to be the other of $b_1$ and $b_2$. The BER performance difference between these two bits $b_1$ and $b_2$, and therefore also between bits $a_1$ or $a_2$, can be controlled by setting a value of μ, as discussed above, taking into account the propagation condition of each user, the noise and interference seen by each user, and the noise and interference suppression capabilities of each receiver.

The transmitter is generally indicated at 130. A bit stream for the first user, User 1, is indicated at 131, and this is processed by the source encoder 134, the channel encoder 138. Other components such as an interleaver, bit puncturer, and any other functions performed during the transmit process may be included in the transmitter. Similarly, a bit stream for the second user, User 2, is indicated at 132, and this is processed by the source encoder 136, the channel encoder 140 and any other functions performed during the transmit process. The output of the first channel is indicated at $a_1$ while the output of the second channel is indicated at $a_2$. The bit stream mapper 142 maps these to bits $b_1$ and $b_2$ as described above. The 4-UASK modulator 150 performs modulation based on the bits received for two users. Each UASK symbol contains one bit for User 1 and one bit for User 2. The 4-UASK modulator 150 performs modulation taking into account the value of μ received at 152. The output is a symbol "s" at 156 which in the particular example is processed by a D/A (Digital-to-Analog) converter 158, Tx filter 160, and an RF amplifier 162 before being transmitted on transmit antenna 164. Of course, the particular processing of the symbols prior to transmission on a wireless or wireline channel is implementation specific. As in previous embodiments, the transmitter may include additional components (e.g. a frequency up-converter), not shown.

A first receiver 170 for User 1 is shown. The receiver 170 may include a receive antenna 171 or a conducted input port, RF front-end 172, A/D converter 174, demodulator 176 which takes into account the parameter μ input at 177, Symbol-to-bit demapper 178 which takes into account a parameter L input at 181 indicative of which bit(s) are for that receiver, a bit stream demapper 179 that chooses the strong or weak bits in the symbol constellation according to which bit is for that receiver, channel decoder 180 and optional source speech decoder 182. Symbol-to-bit demapper 178 makes a hard decision or a soft decision for each bit. The receiver 190 for a second user, User 2, includes a receive antenna 192 or a conducted input port, RF front-end 194, A/D converter 196, demodulator 198 that performs demodulation taking into account the parameter μ at 200, a Symbol-to-bit demapper 202, which takes into account parameter L input at 201 indicative of which bit(s) are for that receiver, a bit stream demapper 203 that chooses the strong or weak bits in the symbol according to which bit is for that receiver, channel decoder 204 and optional source decoder 206. Symbol-to-bit demapper 202 makes a hard decision or a soft decision for each bit. Practically, if μ is updated adaptively or in a predetermined manner, in some embodiments all of the receivers are implemented to be capable of performing demodulation taking into account a value of μ. Otherwise, if μ is fixed without adaptation, μ is predetermined and known by all users. It should be readily apparent how to extend the example of FIG. 12 to embodiments in which there are additional users, and embodiments in which UQAM modulation is performed instead of UASK modulation.

GSM Embodiment

Figure 13:
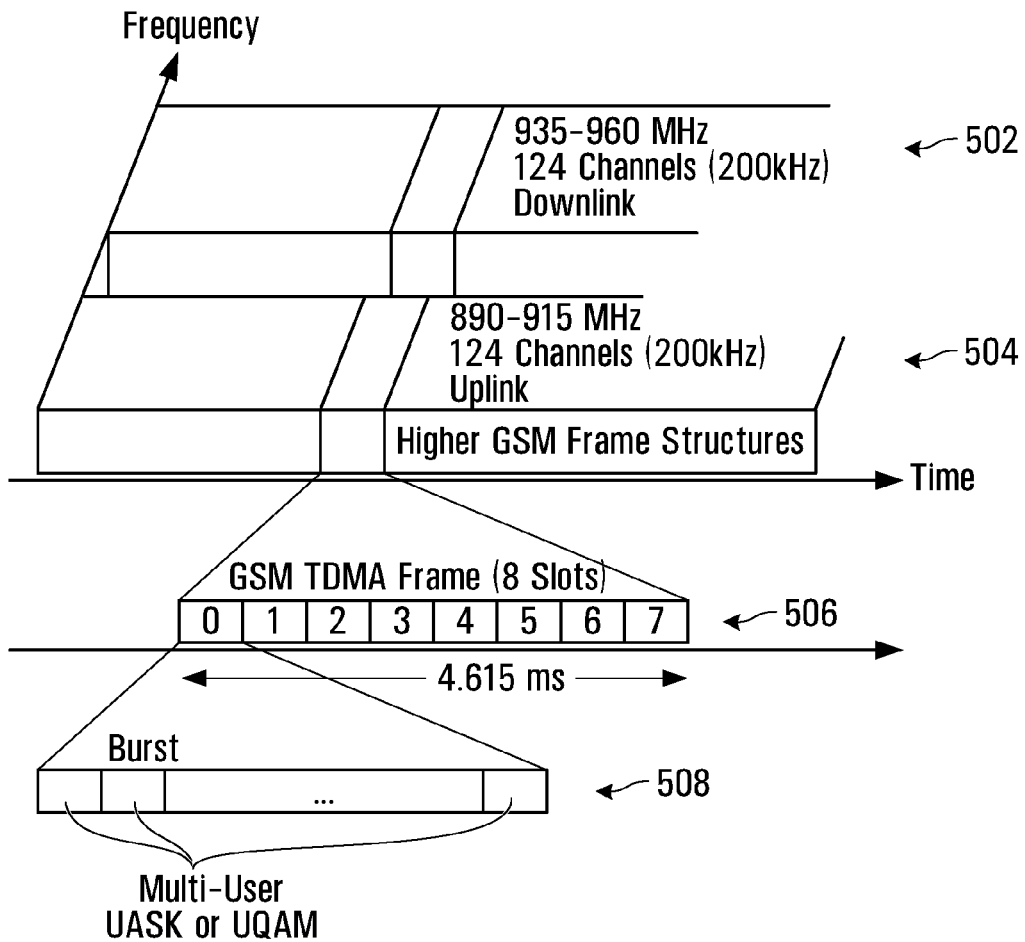
FIG. 13 is a schematic diagram showing the application of multi-user UASK or UQAM to GSM (Global System for Mobile Communication)

Another embodiment provides an access scheme for GSM that employs time-division multiple access (TDMA) in combination with UQAM or UASK modulation. As shown in FIG. 13, for GSM, in the 900 MHz frequency band for example, the uplink and downlink are separated bands as indicated at 502,504 respectively, each of which has 25 MHz bandwidth including 124 channels. Carrier separation is 200 kHz. A TDMA frame is indicated at 506 and consists of 8 timeslots corresponding to one carrier frequency. Each timeslot can be used to transmit a burst of symbols. In original GSM systems, Gaussian minimum shift-keying (GMSK) modulation is employed, each GMSK symbol carries one user bit and each timeslot may transmit only one user's data. With M-ary ASK or M-ary QAM modulation, one symbol can transmit more bits for a single user when M≥4. Alternatively, with UASK or UQAM modulation, one timeslot can be used to transmit a burst of multi-user UASK or multi-user UQAM symbols, as indicated at 508, and each symbol transmits one or several bits for each of multiple users in one symbol period. Alternatively, with UASK or UQAM modulation, one timeslot can be used to transmit a burst of UASK or UQAM symbols which are for the same receiver but are used to apply different error immunities (that is, different error protections) to different bits.

More specifically, in some embodiments, each timeslot is used to transmit a burst of multi-user UASK symbols, such as 4-UASK symbols for two users, 8-UASK symbols for three users, or 16-UASK symbols for four users to name a few examples. In some embodiments, each timeslot is used to transmit a burst of multi-user UQAM symbols, such as 16-UQAM symbols for four users. These embodiments at least double the peak voice or data capacity by multiplexing at least two users simultaneously on the same physical radio resource. When multiple mobile users are sharing the same radio resource in a cell simultaneously, the channel quality experienced by those users may be different due to their different physical locations, radio environment, etc. The use of UASK or UQAM modulation to multi-users allows the system to balance the error rate performances among all users and helps to reduce the overall transmitted signal power by optimizing the relative bit error rates. In some embodiments, the constellation is adapted with adaptive values of μ as described previously in order to keep the required BER performances maintained when the propagation condition varies.

Use of Training Sequences to Convey Parameter(s) Indicative of Unevenness of the Signal Constellation and/or Bit Assignment Another embodiment of the application provides methods and apparatus for the use of training sequences to convey parameter(s) indicative of unevenness of the signal constellation and/or bit assignment. These methods may be used to convey μ as defined above, but more generally can be used to convey any parameter(s) used to allow the receiver to determine the constellation used. In the specific example detailed below, two different training sequences are associated with two different bit assignments, this being particularly appropriate for the 4-UASK embodiment to indicate either the first or second bit assignment of two possible bit assignments. In embodiments with larger constellations, additional training sequences may be associated with additional bit assignments.

As an example, a detailed example of downlink (DL) transmission for two-users with 4-UASK will be described, in which the data for the user who needs better link performance or error protection is designated as $b_1$, and the data for another user is designated as $b_2$. The BER performances of these two bits can be controlled by setting a proper value of $\mu$, as discussed above, according to the propagation conditions and the radio receiver capabilities of each user.

A specific method of signalling $\mu$ and bit assignment will now be described for the 4-UASK embodiment that is appropriate for the GSM voice channel, although it may find wider application.

1) Frame Structure of GSM Voice Channel

In GSM, the transmitted data sequence is organized into bursts. Each burst occupies a time slot of 15/26 ms. Each normal burst contains a sequence of 58 message bits, a training sequence code (TSC) of 26 bits, and another sequence of 58 message bits, 6 tail bits and 8.25 guard period bits. The TSC is used in the receiver for channel estimation and other functions. According to an embodiment of the application, it is also used by the transmitter to signal $\mu$ and by the receiver to estimate $\mu$. According to an embodiment of the application where a bit stream for multiple users is sent to multiple receivers, the TSC is also used to signal which bits are assigned to each user.

2) Conveying $\mu$ to the Receiver and Estimation of $\mu$ by the Receiver

According to an embodiment of the application, a training sequence is transmitted that has embedded within it one or more parameters indicative of the constellation, for example indicative of unevenness of the constellation. The above-introduced $\mu$ for 4-UASK is a specific example.

Consider a DL transmission with 4-UASK, for two users. First, two example training sequences of real numbers are defined in forms of column vectors of length m=26 as $$t_1 = [h,1,-h,1,1,-h,1,-h,-1,-h,1,h,h,-1,h,1,1,-h,1,h,-1,1,-h,-1,-h]^T,$$

and $$t_2 = [h,-1,h,1,1,h,-1,-h,-1,1,-h,-1,-h,h,-1,h,1,-1,h,1,h,1,-1,-h,-1,h]^T.$$

where $h=1+2\mu$, and the superscript $^T$ stands for matrix transpose. The bit sequences corresponding to the real sequences $t_1$ and $t_2$ may be denoted by $\tau_1$ and $\tau_2$ respectively. For each burst to be transmitted, either $t_1$ or $t_2$ is selected as the training sequence. The transmitter transmits either $t_1$ or $t_2$, in so doing, signalling a value for $\mu$ to the receiver. As such, in this application, the value of $\mu$ is fixed for at least the length of one data burst.

The receiver knows all candidate TSC's but does not know which TSC is selected in the transmitted burst.

Corresponding to $t_1$ and $t_2$, two sequences, $\tilde{t}_1$ and $\tilde{t}_2$ are defined, respectively, by replacing h and −h in $t_1$ and $t_2$ by 1 and −1 respectively. The sequences $\tilde{t}_1$ and $\tilde{t}_2$ are properly designed such that ideally $|t_i \tilde{t}_j|=0$, or, at least, $|t_i \tilde{t}_j| \ll |t_i \tilde{t}_i|$, for $j \neq i$. The sequences $\tilde{t}_1$ and $\tilde{t}_2$ are pre-installed in the receiver. For convenience, a two-column matrix, $T=[\tilde{t}_1 \; \tilde{t}_2]$ is defined.

Two sub vectors of $t_i$ are defined, denoted by $t_{\mu,i}$, where i=1 and 2. The sub vector $t_{\mu,i}$ is a part of $t_i$ with all entries equal to ±1 deleted. In addition, two sub vectors, $\tilde{t}_{\mu,i}$, are defined, obtained by replacing h in $t_{\mu,i}$ with 1. After propagating through an AWGN channel, the received TSC of each burst in the receiver is $$r = t_i + n$$

where $t_i$ is either $t_1$ or $t_2$, and n is a vector representing the noise. Corresponding to the sub vector $t_{\mu,i}$, a sub vector $r_{\mu,i}$ of r is defined.

In the receiver, the estimation of $\mu$ is performed by doing the following calculations.

(i) Compute $$x = [x_1 \; x_2] = r^T \cdot T \quad (22)$$

where x is a row vector of two real numbers. $x_i$ is the inner product of r and $\tilde{t}_i$, i=1 and 2.

(ii) Compare $x_1$ and $x_2$. If $x_1 > x_2$ let L=1; otherwise let L=2. On the basis of the determination of L, a conclusion is reached that the training sequence $t_L$ is used by the transmitter.

(iii) Compute $$y = r_{\mu,L}^T \cdot \tilde{t}_{\mu,L} \quad (23)$$

(iv) Compute the estimate of $\mu$ as $$\hat{\mu} = \frac{1}{2}\left(\frac{m - m_\mu}{m_\mu} \frac{y}{x_L - y} - 1\right) \quad (24)$$

where m=26 is the length of each TSC, and $m_\mu$ is the length of the sub vector $t_{\mu,L}$.

Increasing the length of the training sequence may increase the accuracy of the estimate. To improve the estimation accuracy, the received training sequences of multiple bursts, for example four bursts, can be concatenated. Then, the concatenated long sequence is used as r in equation (22) above. At the same time, assuming the four bursts uses the same TSC, $\tilde{t}_i$, i=1 and 2, are repeated four times to form two long sequences, and these are used to form T in (22) above. Also, the concatenated $r_{\mu,L}$ from the four bursts should be used in (23), with a long sequence obtained by repeating $\tilde{t}_{\mu,L}$ four times.

3) Detection of Bit Assignment

In some of the embodiments described above, a bit stream mapping operation is performed which maps bit(s) of each receiver to bit positions for the purpose of UQAM or UASK mapping. Each receiver needs to know which bit(s) are for that receiver. In some embodiments, one or more parameters L indicative of which bit(s) are for a given receiver are used to convey this information. A detailed example of how this information might be conveyed to the receiver is provided below. More generally, the receiver simply needs to know which bits are for that receiver, and this information can be obtained in any manner.

For the particular case where there is a weak bit and a strong bit, in addition to knowing $\mu$, each receiver also needs to know which bit, the strong bit or the weak bit, is the bit assigned to that particular user. In some embodiments, a one to one correspondence between training sequence and bit assignment is used to signal which bit is assigned to a particular user. For the above example, the transmitter transmits $t_1$ to indicate an assignment of the first bit position $b_1$ to the receiver (i.e. the more reliable bit position), and transmits $t_2$ to indicate an assignment of the second bit position $b_2$ to the receiver (i.e. the less reliable bit position). In step (ii), the receiver determines a value of L, and this can be used as an indication of the bit assignment. In a particular example, L=1 means the user has been assigned $b_1$, while L=2 means the user has been assigned $b_2$.

Figure 14:
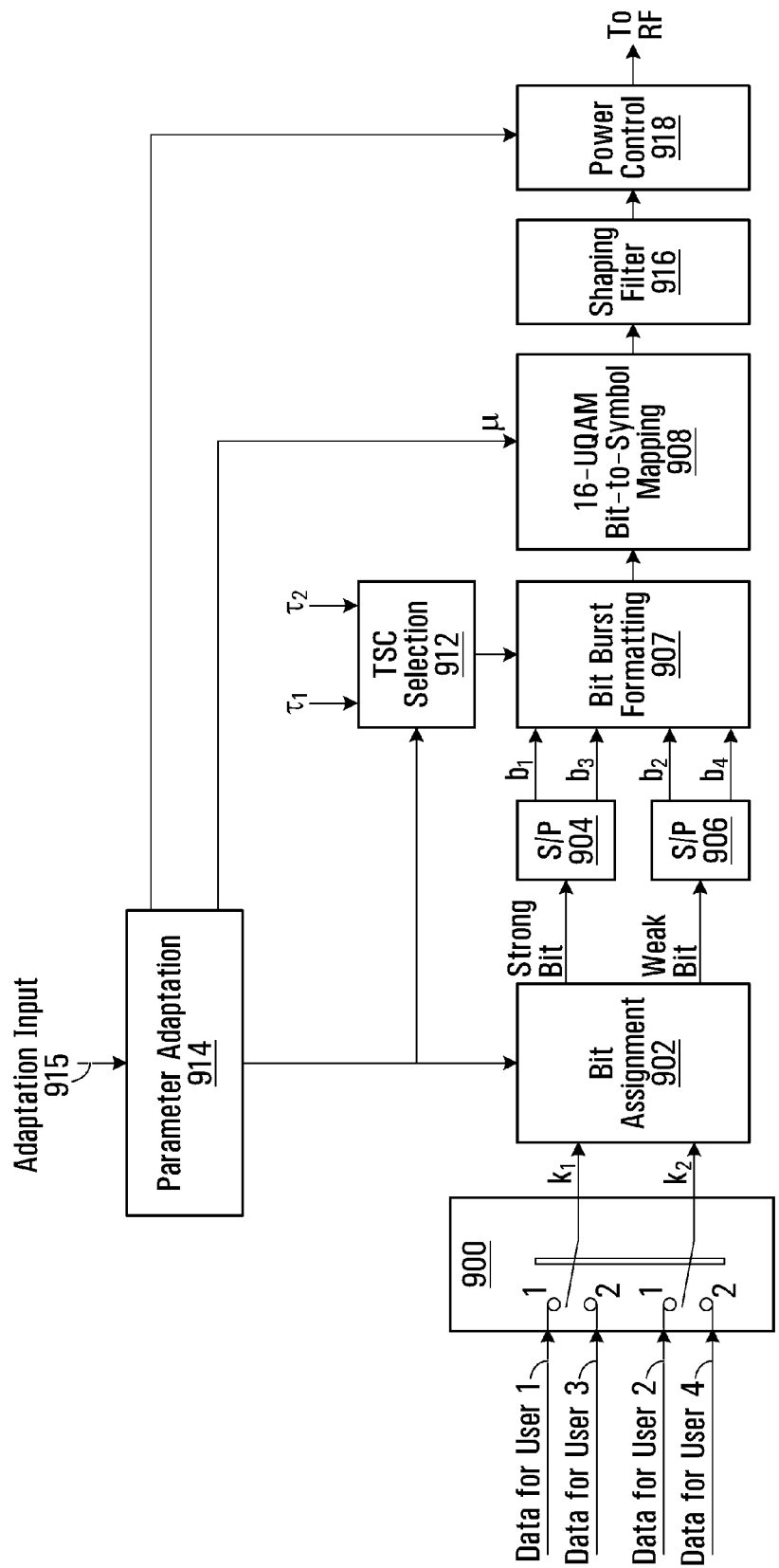
FIG. 14 is a schematic diagram of a transmitter showing the application of 16-UQAM for four users, in which training sequences are used to encode the constellation properties and to assign bits to a particular user.

FIG. 14 is a block diagram of a transmitter configured to convey bit assignment and $\mu$ using training sequences associated with 16-UQAM. To reduce the complexity, with this embodiment in 16-UQAM, both the I and Q sub channel use the same value of $\mu$. In the illustrated example, this is achieved by dividing four users to two non-overlapping groups, with two users in each group. In the illustrated example, the first group contains "User 1" and "User 2", and the second group contains "User 3" and "User 4". The bit streams of the two groups are selected alternatively in time by selector logic 900.

That is, during a certain time period, e.g., a period of several bursts, the strong bits of both I and Q sub channels are assigned to User 1, and the weak bits of both I and Q sub channels to User 2. Then in the next period, the strong bits of both I and Q sub channels are assigned to User 3, and the weak bits of both I and Q sub channels to User 4. In this way, during each period, the same $\mu$ value is used for both I and Q sub channels. The mapping of the users within a group to either the strong or the weak channel is done by the bit assignment block 902, this being analogous to the above-described bit stream mapping function. The outputs of the bit assignment block 902 include strong bits and weak bits. Serial to parallel converter 904 produces a parallel output containing two strong bits $b_1$ and $b_3$. Serial to parallel converter 906 produces a parallel output containing two weak bits $b_2$ and $b_4$. Bits $b_1$, $b_2$, $b_3$ and $b_4$ input to bit burst formatting 907 where a training sequence is added for each user. The training sequence is selected by training sequence selection block 912. Either training sequence $\tau_1$ or $\tau_2$ respectively is inserted for each user. More generally, training sequences are used as described above for the purpose of conveying bit position assignment, and $\mu$. The output of the bit burst formatting 907 is mapped to 16 UQAM symbols by the 16 U-QAM bit-to-symbol mapping 908. Parameter adaptation is indicated at 914. This involves determining what constellation to use, having regard to any of the factors mentioned previously referred to collectively as adaptation inputs 915. In the illustrated example, this involves producing the parameter $\mu$ which is used by the bit assignment block 902, the 16-UQAM bit-to-symbol mapping 908 and the training sequence selection 912. Also shown at the output is a shaping filter 916 and power control block 918. In the illustrated example, the parameter adaptation 914 also has some control over the operation of the power control 918. Other components may also be included.

Codec Embodiments

The embodiments described previously provide systems and methods for the use of uneven constellations (e.g. UQAM and UASK) to provide controllable bit-error rate (BER) performance, in some cases adaptively controllable, for each bit among the k bits of each symbol.

In another embodiment, uneven symbol constellations are employed to enable the more efficient transmission of codec bit streams which have requirements for unequal error protection. By taking advantage of the controllable BER performance characteristic of the bits transmitted using uneven constellations, the overall need for additional error correction may be reduced.

Generally, the bits requiring greater error protection will be sequenced into the strong bits of the constellation and those with less subjective importance will be sequenced into the weak bits of the constellation. The bit stream mapper entity described previously is one example of a function that could perform this.

In a first specific example, it is assumed that bits are classified in accordance with one of the conventional implementations described (for example; Class 1a and Class 1b bits; or Class A, B or C or some alternate classification) may be transmitted at the same expected BER.

In some embodiments, bits are first ordered in sequence of decreasing importance at the output of the codec, for example using conventional approaches. The ordered bits are then reordered in such a manner that each bit is positioned such that it gets the BER performance relative to its subjective importance.

In some embodiments, the bit stream ordering from the codec may not be in sequence of decreasing importance as per the example described above. Channel coding and interleaving functions may change the ordering of the bits, but this is in a deterministic manner so the relative positions of the strong and weak bits are still known. Thus the bits may be re-sequenced prior to symbol modulation in order to ensure that each bit is positioned such that it gets the BER performance relative to its subjective importance.

In some embodiments, the ordering according to importance, and the reordering for the purpose of relative BER performance are performed in a single reordering operation at the output of the codec such that each bit output by the codec is positioned such that it gets the BER performance relative to its subjective importance.

In some embodiments, additional processing on the bits output by the codec is performed prior to modulation. Specific examples include but are not limited to channel coding, interleaving, and bit puncturing. In such embodiments, reordering is performed at some point prior to the bit to symbol mapping by a bit stream mapper, or other similar entity so as to again result in each bit being modulated being positioned such that it gets the BER performance relative to its subjective importance.

In a specific example of this, in some embodiments, the output of the speech encoder is further encoded using a channel encoder (for example but not limited to convolutional encoders, turbo encoders, Reed Solomon encoders, Trellis encoders, etc.). In some embodiments the output of the channel encoder is then acted on by other components such as an interleaver and a possible bit puncturer. The sequencing of the output bits onto the strong and weak bits of the symbol constellation is done after all modifications to the bit stream by the possible functions has been completed. The order of the bit stream is deterministic and as such, the relative strength of the bits is still known. There may in some cases be bits that were considered strong bits prior to channel encoding that have been convolved with bits that were considered to be weak bits prior to channel encoding, resulting in bits output from the channel encoder that are a mix of strong and weak bits. It is possible in this case to treat these bits as strong bits. In addition, parity bits that are added to the bit stream (such as CRC bits) could be assigned to strong bit positions in the bit to symbol mapping.

Characterization of a transmission channel to identify the most efficient combination of bit sequencing, error protection and error concealment to exploit the variance in bit error rate between different bits in an uneven constellation may be employed. This process includes the definition of a static list of the most advantageous sequence for reordering the bits from the codec output. In some embodiments, this takes into account a puncturing process such that puncturing bits to reduce the overall transmitted bit stream is performed such that it maps bits to the available strong bits and weak bits in an uneven constellation whilst minimizing the impairment to received voice quality.

In some embodiments, the constellation is adaptively adjusted so as to adaptively control the BER rates available. In some embodiments, this is done to provide a gradual variance in the BER rate from bit to bit (or for given groups of bits) to align with the subjective importance of each bit.

In some embodiments, each time the constellation is adjusted, the receiver needs to determine the constellation used. This can be done by receiving signalling, using the above-described training sequence approach to name a few specific examples.

In another embodiment, the constellation is adjusted in a predetermined manner, for example for a block of bits that is known to the receiver. For example, in some embodiments, the value and variance of μ (more generally of whatever parameters are used and/or the signal constellation per se) is predetermined and is known at both the transmitting and receiving station. As a consequence there is no need for the receiving station to attempt to calculate μ and hence it can be varied more frequently than is the case when the receiver attempts to recover μ. This technique also avoids the overhead associated with explicit signalling of μ. This would allow the optimization of the μ values to adapt the constellations to provide a gradual variance in the BER rate from bit to bit (or for given groups of bits) to align with the subjective importance of each bit.

The predetermined values of μ may be stored in a look up table or other memory at the transmitting and receiving station. Different sets of values of μ may be stored for different codec types and modes. In some embodiments, Over-The-Air procedures are provided to replace and/or modify these values of μ.

As a specific example, where 150 bits are to be transmitted, constellation C1 (with first constellation unevenness that provides associated BERs for each of four bit positions) might be used for 50 bit positions, constellation C2 (with second constellation unevenness that provides associated BERs for each of four bit positions) might be used for 50 bit positions, and constellation C3 (with third constellation unevenness that provides associated BERs for each of four bit positions) might be used for 50 bit positions. This results in a total of 12 different BERs that are available. The 150 bits would then be mapped to the 150 bit positions such that the BER of each bit is aligned with its subjective importance.

In systems that make use of the technique described above, it may be possible that the same performance provided by conventional implementations could be available with the use of a convolutional encoder of a different rate that reduces the overall size of the transmitted bit stream. Alternatively additional puncturing could reduce the overall size of the block to be transmitted. Variance of both the rate of the convolutional encoder and the degree of puncturing could be combined.

Codecs such at the AMR codec used in GSM and UMTS systems support a variety of modes. In some embodiments, the value and degree of variance of the constellation unevenness is adjusted in line with changes in the mode of the codec.

The use of this technique is not limited to the conventional implementations seen in GSM, UMTS and other cellular systems today. Characterization of the transmission channel may identify other error correction and concealment techniques that would work more effectively in tandem with the approach. Characterization of the importance of bits through subjective analysis is just one example of how bits can be prioritized. More generally, any approach to prioritization can be employed; the approach is not limited to speech coding.

Potential advantages of this approach include, but are not limited to, increased capacity, increased voice quality (e.g. enabling higher rate output from the speech codec within a fixed size channel), more robust error performance (e.g. through additional error protection exploiting the reduction in the overall number of bits to be transmitted), and improved efficiency (e.g. through the adaption of the constellation spacing in line with different codec modes).

Figure 15:
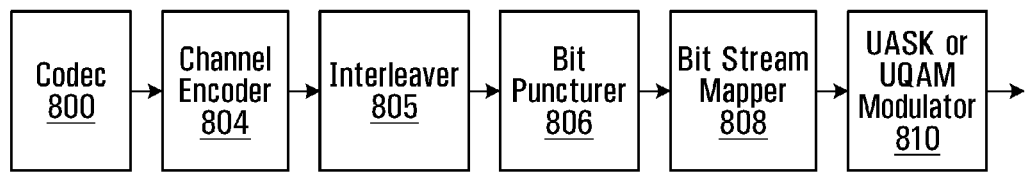
FIG. 15 is a block diagram of a system featuring a codec, a channel encoder, and interleaver, a bit puncturer and bit stream mapper followed by a UASK or UQAM modulator.

Referring now to FIG. 15, shown is a block diagram of a system that includes a codec 800, UQAM or UASK modulator 810, and bit stream mapper 808. Optional components include a channel encoder (such as a convolutional encoder) 804, an interleaver 805, and a bit puncturer 806. The bit stream mapper 808 represents functionality in the system that is responsible for mapping bits to bit positions input to the modulator 810 such that stronger bit positions are used for more important bits, while weaker bit positions are used for less important bits. The specific location of the bit stream mapper 808 is implementation specific, and its functionality may be integrated in with other components. It should be readily apparent that a codec system design is implementation specific, and that other components than those specifically shown in FIG. 15 may be employed in conjunction with a UASK or UQAM modulator.

In a specific example, the bit stream mapper 808 reorders bits at the output of the codec. The reordered bits may then be subject to further manipulation, such as by the illustrated channel encoder and bit puncturer. In this case, the bit stream mapper 808 accounts for where each bit will end up at the input to the modulator in performing its reordering. In another example, the bit stream mapper 808 reorders bits at the input to the modulator 810.

Figure 16:
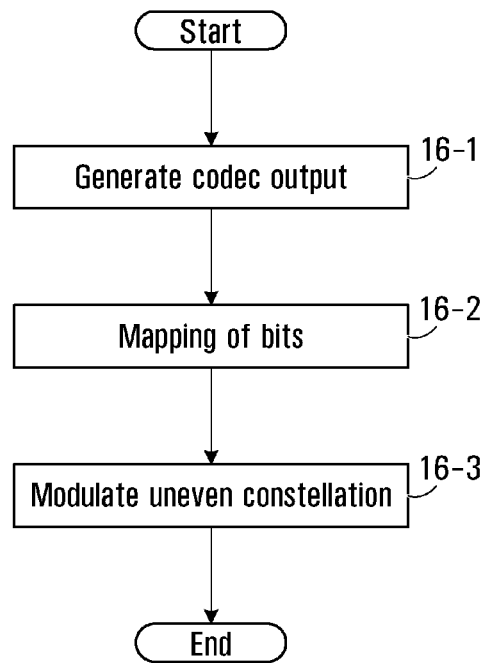
FIG. 16 is a flowchart of a method of using an uneven constellation in a speech encoder application.

Referring now to FIG. 16, shown is a flowchart of a method provided by an aspect of the application. The method begins with generating a codec output at block 16-1. The method continues in block 16-2 with mapping bits of the codec output. In block 16-3 the bits are then used to modulate an uneven constellation. The sequencing of the bits in block 16-2 is such that such stronger bit positions of the uneven constellation are used for more important bits, while weaker bit positions of the constellation are used for less important bits.

The above-described techniques can be easily applied to other modulation and coding schemes that may inherently or adaptively provide unequal bit error protection. Examples of possible other modulation schemes include but are not limited to BPSK, 8 PSK, 32 QAM etc.

Another Mobile Device

Figure 17:
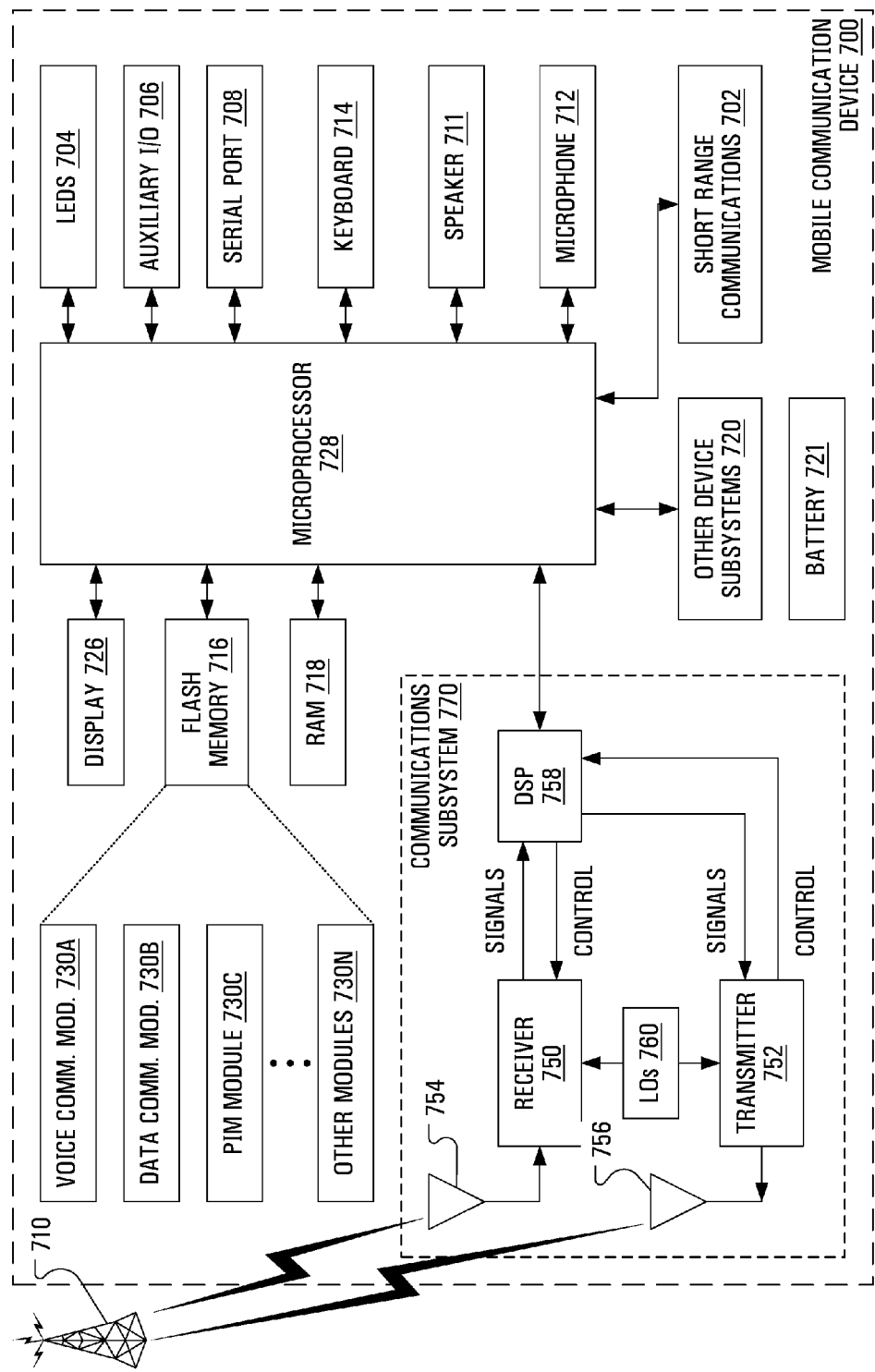
FIG. 17 is a block diagram of another mobile device.

Referring now to FIG. 17, shown is a block diagram of a mobile communication device 700 that may implement mobile device related methods described herein. It is to be understood that the mobile device 700 is shown with very specific details for example purposes only.

A processing device (a microprocessor 728) is shown schematically as coupled between a keyboard 714 and a display 726. The microprocessor 728 controls operation of the display 726, as well as overall operation of the mobile device 700, in response to actuation of keys on the keyboard 714 by a user.

The mobile device 700 has a housing that may be elongated vertically, or may take on other sizes and shapes (including clamshell housing structures). The keyboard 714 may include a mode selection key, or other hardware or software for switching between text entry and telephony entry.

In addition to the microprocessor 728, other parts of the mobile device 700 are shown schematically. These include: a communications subsystem 770; a short-range communications subsystem 702; the keyboard 714 and the display 726, along with other input/output devices including a set of LEDS 704, a set of auxiliary I/O devices 706, a serial port 708, a speaker 711 and a microphone 712; as well as memory devices including a flash memory 716 and a Random Access Memory (RAM) 718; and various other device subsystems 720. The mobile device 700 may have a battery 721 to power the active elements of the mobile device 700. The mobile device 700 is in some embodiments a two-way radio frequency (RF) communication device having voice and data communication capabilities. In addition, the mobile device 700 in some embodiments has the capability to communicate with other computer systems via the Internet.

Operating system software executed by the microprocessor 728 is in some embodiments stored in a persistent store, such as the flash memory 716, but may be stored in other types of memory devices, such as a read only memory (ROM) or similar storage element. In addition, system software, specific device applications, or parts thereof, may be temporarily loaded into a volatile store, such as the RAM 718. In some embodiments, one or more parameters representative of unevenness in the signal constellation are stored in the non-volatile memory or in a volatile store. Communication signals received by the mobile device 700 may also be stored to the RAM 718.

The microprocessor 728, in addition to its operating system functions, enables execution of software applications on the mobile device 700. A predetermined set of software applications that control basic device operations, such as a voice communications module 730A and a data communications module 730B, may be installed on the mobile device 700 during manufacture. In addition, a personal information manager (PIM) application module 730C may also be installed on the mobile device 700 during manufacture. The PIM application is in some embodiments capable of organizing and managing data items, such as e-mail, calendar events, voice mails, appointments, and task items. The PIM application is also in some embodiments capable of sending and receiving data items via a wireless network 710. In some embodiments, the data items managed by the PIM application are seamlessly integrated, synchronized and updated via the wireless network 710 with the device user's corresponding data items stored or associated with a host computer system. As well, additional software modules, illustrated as other software module 730N, may be installed during manufacture.

Communication functions, including data and voice communications, are performed through the communication subsystem 770, and possibly through the short-range communications subsystem 702. The communication subsystem 770 includes a receiver 750, a transmitter 752 and one or more antennas, illustrated as a receive antenna 754 and a transmit antenna 756. In addition, the communication subsystem 770 also includes a processing module, such as a digital signal processor (DSP) 758, and local oscillators (LOs) 760. The specific design and implementation of the communication subsystem 770 is dependent upon the communication network in which the mobile device 700 is intended to operate. For example, the communication subsystem 770 of the mobile device 700 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Other types of data and voice networks, both separate and integrated, may also be utilized with the mobile device 700. The particular devices under consideration here are multi-mode mobile devices, and as such they include hardware and/or software for implementing at least two RATs. More specifically, in a particular example, there would be a respective communication subsystem 770 for each RAT implemented by the device.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 700 may send and receive communication signals over the communication network 710. Signals received from the communication network 710 by the receive antenna 754 are routed to the receiver 750, which provides for signal amplification, frequency down conversion, filtering, channel selection, etc., and may also provide analog to digital conversion. Analog-to-digital conversion of the received signal allows the DSP 758 to perform more complex communication functions, such as demodulation and decoding. In a similar manner, signals to be transmitted to the network 710 are processed (e.g., modulated and encoded) by the DSP 758 and are then provided to the transmitter 752 for digital to analog conversion, frequency up conversion, filtering, amplification and transmission to the communication network 710 (or networks) via the transmit antenna 756.

In addition to processing communication signals, the DSP 758 provides for control of the receiver 750 and the transmitter 752. For example, gains applied to communication signals in the receiver 750 and the transmitter 752 may be adaptively controlled through automatic gain control algorithms implemented in the DSP 758.

In a data communication mode, a received signal, such as a text message or web page download, is processed by the communication subsystem 770 and is input to the microprocessor 728. The received signal is then further processed by the microprocessor 728 for an output to the display 726, or alternatively to some other auxiliary I/O devices 706. A device user may also compose data items, such as e-mail messages, using the keyboard 714 and/or some other auxiliary I/O device 706, such as a touchpad, a rocker switch, a thumb-wheel, or some other type of input device. The composed data items may then be transmitted over the communication network 710 via the communication subsystem 770.

In a voice communication mode, overall operation of the device is substantially similar to the data communication mode, except that received signals are output to a speaker 711, and signals for transmission are generated by a microphone 712. Alternative voice or audio I/O subsystems, such as a voice message recording subsystem, may also be implemented on the mobile device 700. In addition, the display 716 may also be utilized in voice communication mode, for example, to display the identity of a calling party, the duration of a voice call, or other voice call related information.

The short-range communications subsystem 702 enables communication between the mobile device 700 and other proximate systems or devices, which need not necessarily be similar devices. For example, the short-range communications subsystem may include an infrared device and associated circuits and components, or a Bluetooth™ communication module to provide for communication with similarly-enabled systems and devices.

Numerous modifications and variations are possible in light of the above teachings. It is therefore to be understood that within the scope of the appended claims, embodiments may be practiced otherwise than as specifically described herein.

We claim:
1. A transmitter comprising:
 a UASK (amplitude shift keying with uneven distance) modulator or UQAM (quadrature amplitude modulation with uneven distance) modulator that generates a sequence of symbols from input bits by mapping input bits to a sequence of UASK constellations or UQAM constellations, without using superposition, the sequence of UASK or UQAM constellations comprising at least two different UASK or UQAM constellations with different constellation unevennesses, the sequence of symbols comprising at least one symbol from each of the sequence of UASK constellations or UQAM constellations;

a codec that processes a first set of bits to produce a block of bits of a codec output;

a bit stream mapper that sequences bits of the block of bits of the codec output to produce the input bits to the UASK modulator or UQAM modulator such that each bit of the block of bits is mapped to a respective position in the sequence of UASK or UQAM constellations;

wherein after the block of bits is mapped and modulated, a signal containing symbols comprising the sequence of symbols is transmitted, and the transmitter is further configured to determine an adaptation parameter among a plurality of received adaptation inputs, to adaptively select an applicable constellation from among the at least two different UASK or UQAM constellations based on the determined adaptation parameter, to update the different constellation unevennesses from time to time based on the applicable constellation, and to transmit an indication of the update of the different constellation unevennesses to use with demodulation performed at the receiver, the indication including the adaptation parameter indicating the applicable constellation selected by the transmitter from among the at least two different UASK or UQAM constellations.

2. The transmitter of claim 1 wherein UASK modulator or UQAM modulator is a UASK modulator.

3. The transmitter of claim 1 wherein UASK modulator or UQAM modulator is a UQAM modulator.

4. The transmitter of claim 1 wherein each constellation is a UQAM constellation formed by combining two independent UASK constellations, one for an in-phase sub-channel, and one for a quadrature sub-channel.

5. The transmitter of claim 4 wherein for each constellation, a respective unevenness is assigned to each of the in-phase sub-channel and the quadrature sub-channel.

6. The transmitter of claim 5 wherein:
each UQAM constellation is a 16 UQAM constellation formed with two independent 4-UASK constellations;
wherein two bits are mapped to the in-phase sub-channel and two bits are mapped to the quadrature sub-channel;
wherein by setting a proper unevenness to each of the sub-channels, different BER performances for the strong bits and the weak bits can be obtained for each sub-channel.

7. The transmitter of claim 1, wherein the UASK modulator or the UQAM modulator generate updated sequences of UASK or UQAM constellations indicative of the different constellation unevennesses from time to time.

8. A method comprising:
determining at least one adaptation parameter among a plurality of received adaptation inputs;
generating a sequence of UASK (amplitude shift keying with uneven distance) symbols or UQAM (quadrature amplitude modulation with uneven distance) symbols from input bits by mapping input bits to a sequence of an applicable UASK or UQAM constellation adaptively selected from among at least two different UASK or UQAM constellations with different constellation unevennesses, the applicable constellation selected based on the adaptation parameter, and the sequence of symbols comprising at least one symbol from each of the sequence of UASK constellations or UQAM constellations;

generating a block of bits from a first set of bits;

sequencing the block of bits to produce the input bits to the UASK modulator or UQAM modulator such that each bit of the block of bits is mapped to a respective position in the sequence of UASK or UQAM constellations; and transmitting a signal containing the symbols of the sequence of symbols, and the at least one parameter indicating the applicable constellation that was selected and reflective of unevenness in a UASK or UQAM constellation to use via a receiver in performing demodulation.

9. A method comprising:
receiving a signal containing a sequence of symbols including bits mapped to a sequence of an applicable constellation adaptively selected from among at least two different UASK constellations or UQAM constellations having different constellation unevennesses, and at least one parameter determined according to a plurality of parameter inputs, the at least one parameter indicating the applicable constellation, and reflective of unevenness in a UASK or UQAM constellation;

performing UASK (uneven amplitude shift keying) demodulation or performing UQAM (uneven quadrature amplitude modulation) demodulation using the at least one parameter reflective of unevenness to produce bits from the sequence of symbols by using a sequence corresponding to the applicable constellation selected from among that at least two different UQAM or UASK constellations having at least two different constellation unevennesses to reverse a modulation that modulated bits to the sequence of UQAM or UASK constellations without using superposition; and de-mapping the bits produced by demodulating the sequence of symbols to produce a received block of bits by undoing a mapping of bits of a block of bits to a respective position in the sequence of constellations.

10. The method of claim 9 where the UASK symbols or UQAM symbols are UASK symbols.

11. The method of claim 9 where the UASK symbols or UQAM symbols are UQAM symbols.

12. The method of claim 9 wherein each constellation is a UQAM constellation formed by combining two independent UASK constellations, one for an in-phase sub-channel, and one for a quadrature sub-channel.

13. The method of claim 12 wherein for each constellation, a respective unevenness is assigned to each of the in-phase sub-channel and the quadrature sub-channel.

14. The method of claim 13 wherein:
each UQAM constellation is a 16 UQAM constellation formed with two independent 4-UASK constellations;
wherein two bits are mapped to the in-phase sub-channel and two bits are mapped to the quadrature sub-channel;
wherein by setting a proper unevenness to each of the sub-channels, different BER performances for the strong bits and the weak bits can be obtained for each sub-channel.

15. A transmitter comprising:
a UASK (amplitude shift keying with uneven distance) modulator or UQAM (quadrature amplitude modulation with uneven distance) modulator that generates symbols from input bits; and a parameter adaptor that adapts at least one adaptation parameter from among a plurality of received adaptation inputs, that adaptively determines an applicable constellation to use among a plurality of different constellations via the UASK modulator or the UQAM modulator, wherein the parameter adaptor determines the applicable constellation to use via the UASK modulator or the UQAM modulator by determining at least one adaptation parameter based on a plurality of adaptation inputs, the adaptation parameter including a parameter reflective of unevenness in the constellation used by the UASK modulator or the UQAM modulator, and the transmitter transmits the at least one adaptation parameter indicating the applicable constellation that was selected to use and reflective of unevenness in the constellation to a receiver to facilitate demodulation performed at the receiver.

* * * * *